United States Patent
Doris, Sr.

(10) Patent No.: US 10,769,652 B2
(45) Date of Patent: Sep. 8, 2020

(54) METHOD AND APPARATUS FOR PROMOTING SALES AND INCREASING BRAND NAME RECOGNITION

(71) Applicant: Errol S. Doris, Sr., Countryside, IL (US)

(72) Inventor: Errol S. Doris, Sr., Countryside, IL (US)

(*) Notice: Subject to any disclaimer, the term of this patent is extended or adjusted under 35 U.S.C. 154(b) by 113 days.

(21) Appl. No.: 15/866,996

(22) Filed: Jan. 10, 2018

(65) Prior Publication Data

US 2018/0144358 A1    May 24, 2018

Related U.S. Application Data

(63) Continuation-in-part of application No. 14/421,229, filed as application No. PCT/US2014/026610 on Mar. 13, 2014, now abandoned.

(60) Provisional application No. 61/781,461, filed on Mar. 14, 2013.

(51) Int. Cl.
    *G06Q 30/02*    (2012.01)
(52) U.S. Cl.
    CPC ............... *G06Q 30/0207* (2013.01)
(58) Field of Classification Search
    CPC ........... G06Q 30/0207; G06Q 30/0209; G06Q 30/0255; G06Q 30/0212
    USPC ............. 705/14.12, 14.14, 14.53; 463/9, 42; 273/150 R
    See application file for complete search history.

(56) References Cited

U.S. PATENT DOCUMENTS

| | | | |
|---|---|---|---|
| 8,328,618 B2* | 12/2012 | Ekisheva | G07F 17/329 463/17 |
| 2002/0028708 A1 | 3/2002 | Busch | |
| 2008/0035724 A1 | 2/2008 | Vawter | |
| 2009/0198576 A1 | 8/2009 | Rogers | |
| 2010/0035677 A1* | 2/2010 | Kido | G07F 17/32 463/16 |
| 2012/0323656 A1 | 12/2012 | Leach | |
| 2016/0092979 A1* | 3/2016 | Wolken | G06Q 30/08 705/26.3 |

* cited by examiner

*Primary Examiner* — Igor N Borissov
(74) *Attorney, Agent, or Firm* — Cherskov Flaynik & Gurda, LLC

(57) ABSTRACT

A method for promoting sales and increasing brand recognition is described. The method includes selecting a brand name based on customer purchases enumerated on a transaction receipt generated on basis of transactions performed by a particular customer. The brand name is then obfuscated. The customer is provided an application to be used in conjunction with the obfuscated brand name to try and complete the missing letters in the brand name. The customer is rewarded with an incentive for uncovering the brand name and in order to submit the solution the customer is obligated to provide demographic information.

4 Claims, 23 Drawing Sheets

METHOD AND APPARATUS FOR PROMOTING SALES AND INCREASING BRAND NAME RECOGNITION

PRIORITY

This application is a continuation in part of U.S. application Ser. No. 14/421,229, presently pending, which was a national filing of PCT application PCT/US2014/026610 filed on Mar. 13, 2014, that claimed the benefits of U.S. Provisional Application No. 61/781,461 filed on Mar. 14, 2013, presently expired, the entirety each of which is incorporated herein by reference.

BACKGROUND OF THE INVENTION

1. Field of the Invention

This invention relates to a method for promoting brands at point of sale scenarios, and more specifically, the invention uses cash register receipts and coupons as promotion vehicles for various well-known brand names.

2. Background of the Invention

Brick and mortar retailers process in access of 45 billion cash register transactions each year. There are more than 310,000 cash registers at these retailer locations in the United States.

Millions of stock keeping units (SKUs) vie for shelf space in stores all over the world; all in an effort to expand brand recognition and therefore sales. Retail chain stores average about 45,000 SKU's per location. However, only so much space is available in typical brick and mortar retail outlets. The average Big Box retailer stocks an inventory of between 90,000 and 120,000 items in warehouses. These items are sold exclusively by internet.

A need exists in the art for a vehicle to expand brand exposure without concomitant increase in allocation of shelf space. The vehicle should be visible to every purchaser visiting brick and mortar establishments. The vehicle should also engage the purchaser and ideally leverage that purchaser's penchant for certain products.

SUMMARY OF INVENTION

An object of the invention is to provide cost effective brand exposure in brick and mortar establishments that may overcome many of the disadvantages of the prior art.

Another object of the present invention to provide a method for pre-selling revenue futures to retailers. A feature of the invention is the use of cash register receipts to leverage a purchaser's preference for certain products. An advantage of the invention is that retailers share in advertising proceeds that are generated when the cash register receipt is used as an advertising vehicle.

Still another object of the present invention is increasing advertising through purchaser incentives and participation. A feature of the invention is using point of sale advertising vehicles identifying buyer preferences to induce customers to participate in a contest. An advantage of the invention is that point of sale vendor support is provided in exchange for creating an attractive audience for brand managers of those retail outlets.

Yet another object of the present invention is to increase exposure of customer-preferred advertised brands by utilizing a fast response customer experience via a smart phone and other intelligent devices. To facilitate this use, the customer will utilize an "app" linking to a web portal displaying a game play incentive program that uses the brand names as features of the game play.

Briefly, the invention provides a method for promoting sales and increasing brand recognition, the method comprising selecting brand names of products based on customer purchases enumerated on a customer receipt, wherein a specific alpha-numeric sequence appears on that receipt; obfuscating one of said brand names on the customer receipt so as to induce a customer to attempt to guess the one of said brand name; and determining if the customer guessed correctly. Each winning is determined by the customer logging on to a web portal and entering the special code displayed on the cash register receipt.

Also provided is a brand-name promotional system, the system comprising a means (e.g. a scanner) for recording customer purchases at a retail outlet; means for categorizing product classes based on the customer purchases; game piece generator for printing indicia onto a customer receipt; wherein the indicia is an obfuscated brand name found in the product classes; and means for determining if a customer correctly guesses the brand name from the indicia. The system also provides a method to retrieve the customer's winning remotely, for example via a web portal.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

Figure 1:
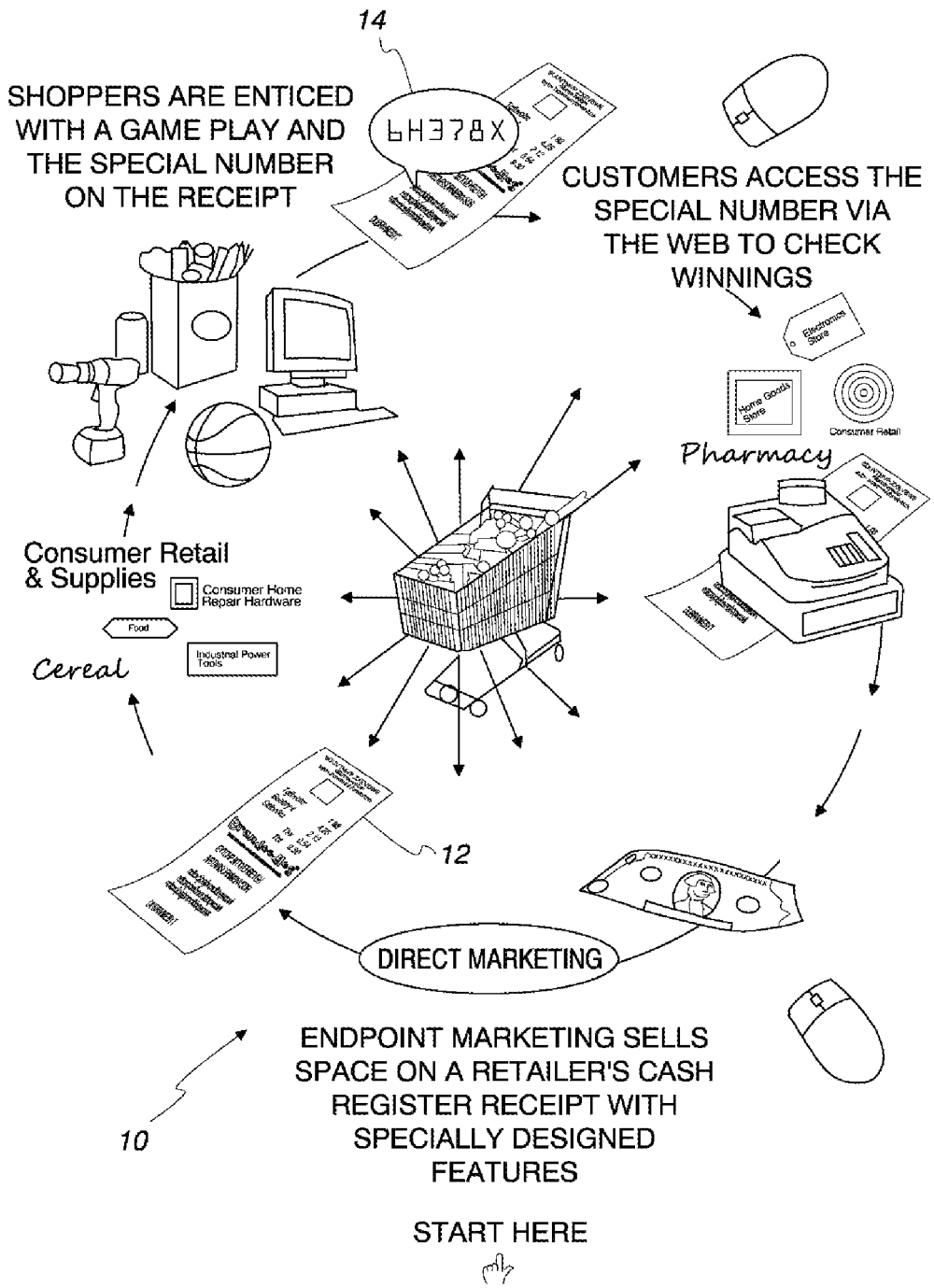
FIG. 1 depicts a flow chart showing a summary of one embodiment of the system, showing player, controller, advertiser, and retailer functions.

The foregoing summary, as well as the following detailed description of certain embodiments of the present invention, will be better understood when read in conjunction with the appended drawings.

To the extent that the figures illustrate diagrams of the functional blocks of various embodiments, the functional blocks are not necessarily indicative of the division between hardware circuitry. Thus, for example, one or more of the functional blocks (e.g. processors or memories) may be implemented in a single piece of hardware (e.g. a general purpose signal processor or a block of random access memory, hard disk or the like). Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invented method controls promotion of various products. The method provides a means for revenue building for retailers from their existing vendor bases. A cornerstone of the method is to induce cash receipt holders (i.e., purchasers of goods) to utilize the cash receipt as a game piece. An exemplary inducement is to associate the cash receipt with a popular board game. In an embodiment of the method, the cash receipt displays the board game name in its familiar logo type.

Retail outlets are suitable venues for practicing the method. Exemplary retailer types include home improvement stores, supermarkets, grocery stores, pharmacies, general stores, electronic stores, computer stores, variety goods stores, department stores, and club membership stores. In 2012, these retailers executed more than 45 billion cash transactions at over 47,000 locations, each with an average of nine point-of-sale (POS) cash registers or terminals.

FIG. 1 is a schematic depiction of the invented method, the method designated as numeral 10. A first step in the method is to produce a cash register receipt with printed indicia 12. In one embodiment, the indicia will be specific for the purchaser's type of goods bought. In another embodiment, the indicia will have no bearing on any of the current goods purchased and will not be based on the class of goods just purchased. However, in another embodiment indicia is specific to type of store where the receipt was printed and in other embodiments, the "class" of goods will be reflected in the indicia. For example, in use of this embodiment in a supermarket setting, there are three classes: (a) food/beverage (b) health & beauty (c) household. The home improvement store uses three exemplary classes as well (a) tools (b) hardware (c) appliances. Typically with a promotional coupon program, no one provides incentive at the point of sale with immediate savings, the coupon provider incentivizes the customer to make a return store visit that day, or another day, or online, to purchase the items promoted.

Aside from the standard printed data on the receipt, such as items bought, price, tax, return policies, etc., the receipt will include two unique additions which transforms it into a game piece. First, the receipt will have an obfuscated version of a brand name the purchaser has seen before. In an embodiment of the invention, the brand name is selected based on the database established for that particular purchaser. In another embodiment of the invention, both the retailer and the advertiser is responsible for populating the database.

Second, the receipt will also have a number string, word string, or an alpha-numeric string 14. Ostensibly, this second indicia will allow purchasers access to a website to check their winnings when they have attempted guessing the brand name from the obfuscated version of the brand name on their cash receipt. However, the second indicia will, just as importantly, originate from a plurality of unique identifier strings associated with a brand name guessing game, for example the Brandoodles® board game. The board games come in both virtual and hardcopy form. Virtual ones allow the board game to be structured toward the individual purchaser's buying preferences, and the database of that purchaser's repeated purchases and visitations to the website.

Generally, the game is developed in different media forms. For example, as an embodiment in a board games such as Brandoodles®, which is owned by BELCOM CORP. of Chicago, Ill., and comprises a brand name guessing game.

Another embodiment comprises a television game show. In this embodiment, the audience utilizes a smart phone or intelligent device to participate onsite or remotely from the show venue.

Yet another embodiment is an online version of a well-known board game, such as Brandoodles®. A multi-faceted web portal hosts the player access portal. Retrieval of winnings occurs by means of coupons or codes based on historical data maintained by advertisers and retailers. That data is retrieved and applied to the on-line interaction via a standard data link. The database of advertised products is further determined and modified as part of the progression of the game.

Figure 2A:
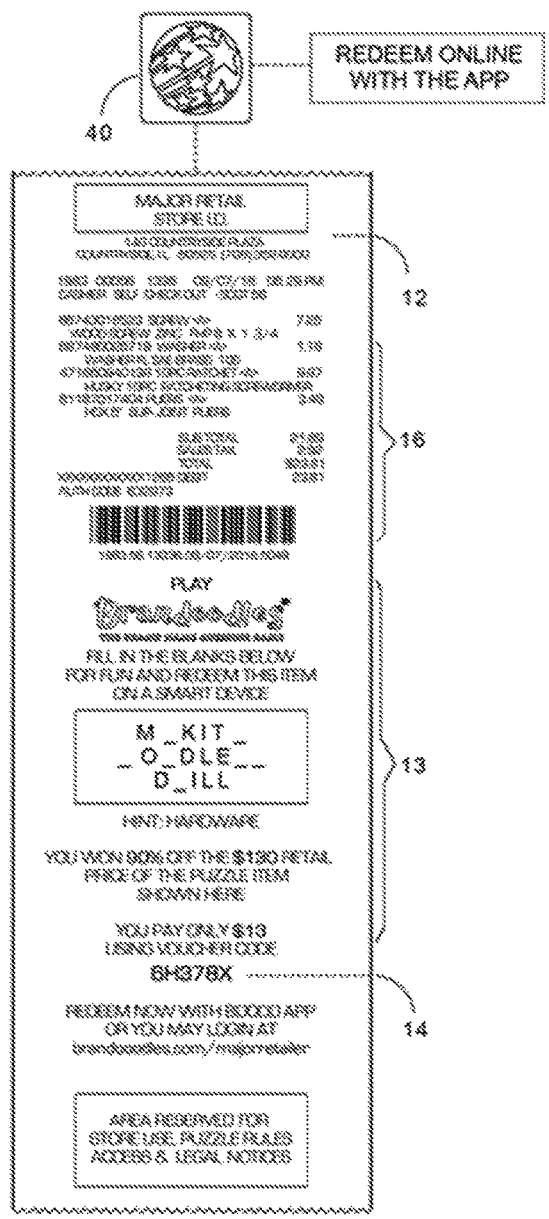
FIG. 2A depicts an embodiment of static paper receipt from a retailer per one embodiment of the invention.
Figure 2B:
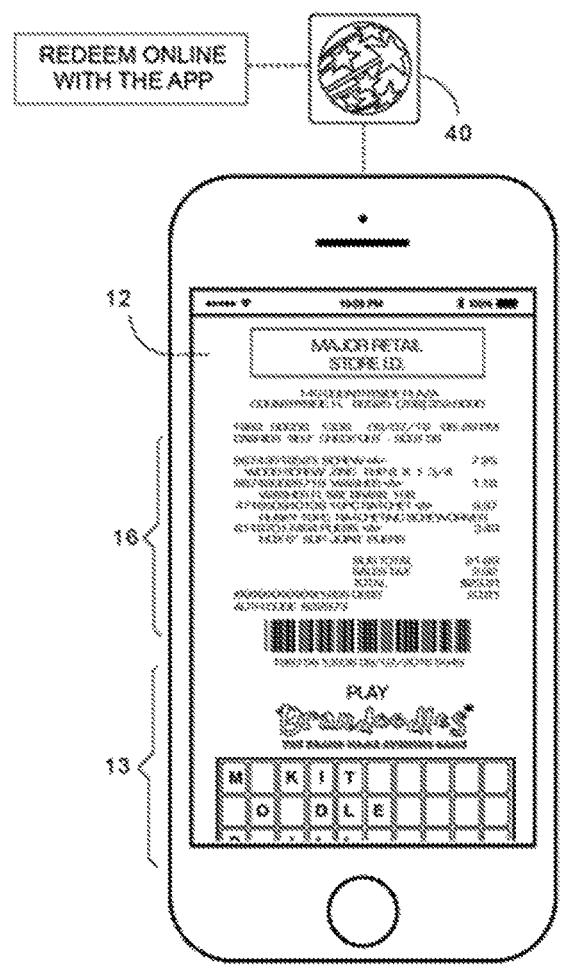
FIG. 2B depicts a sample of a digital receipt from a retailer per one embodiment of the invention.

FIGS. 2A and B are schematic diagrams of exemplary cash register receipt/game pieces 12. A top portion 16 contains typical purchase details and return policy details. A bottom portion 18 of the cash register receipt 12 contains the aforementioned two unique additions which transforms the receipt into the game piece. The first game piece contains the obfuscated brand name 13. In the example depicted in FIG. 2A, the brand name is MAKITA CORDLESS DRILL, and therefore an appropriate genre for the type of store (e.g. a food store) which generates the particular cash register receipt or another type of transaction receipt or other form of proof of purchase. FIG. 2B contains the obfuscated brand name 13 MAKITA CORDLESS DRILL which would be appropriate for any type of shopper, in any type of store establishment that generates such a cash register receipt or other form of proof of purchase such as a digital order confirmation. The functions responsible for the receipt/game pieces 12 are depicted as the system 39, described in detail below.

The second edition is the aforementioned number string, word string or alpha-numeric string 14. The specific alpha-numeric string depicted (6H378X) is for illustrative purposes only and not intended to limit the invention to this symbol sequence. In one embodiment, the system employs commercially available software to generate millions of randomly generated strings. The association of the alpha-numeric string and Brandoodles® is based on (a) the assignment of select alphanumeric codes that is assigned a specific value by an administrator account, such as administrator@brandoodles.com in one embodiment and (b) the pre-sale of a bucket of codes being sold by the administrator@brandoodles.com to the advertiser and/or the retailer for the purpose of participation. The codes can be generated using a string generation software, such as an online string generator found in several locations such as at the sweepjudge.com string generator, the source code of which is attached hereto as Appendix B.

In operation, a game administrator (e.g., a licensee of the invented process) charges advertisers (e.g. brand managers) a fee to advertise their brand name on a cash register as a receipt or digital proof of purchase. The retail outlet is charged a few hundreds of a U.S. cent as a "click charge" to access this revenue generator. The retailers agree to use the face of their proof of purchase system as a portal to the process. The retailers and brand managers make product selections, and determine the number of stores involved and the duration of involvement.

The game administrator manages the pre-sells (e.g., the aforementioned click charges) and generates the random numbers 14 appearing on the cash register receipts. A method for transferring the random numbers is for the administrator to load them into the retailer- or brand manager's headquarter-database.

The game administrator then converts the pre-sold number 14 to game play. Winning numbers are preselected. In an embodiment of the invention, a brand manager pre-selects groups of the winning numbers according to an algorithm that generates the numbers according to the odds of winning. In this case, everyone becomes a winner. For example, if 1000 products are preselected to be displayed, the odds shall be designated according to a discounting process, given the distribution sample as follows:

| 30 wins | 50 wins | 70 wins | 90 wins | 110 wins | 130 wins | 150 wins | 170 wins | 200 wins |
|---|---|---|---|---|---|---|---|---|
| 90% | 80% | 70% | 60% | 50% | 40% | 30% | 20% | 10% |

Therefore, if a Retailer sold a product for $20, 30 wins at a 90% discount would be $18 off the price at which the buyer would only pay $2. The Buyer would receive a retrieval code with a value of $18 at redemption. Likewise, 200 wins at a 10% discount, the Buyer would receive a discount of $2 off the price at which the buyer would pay $18 at redemption.

Hence, if the Seller is an Automotive Dealer selling a big ticket item such as a Chevrolet Cruze with a list price of $17,130, the administrator has the option to change the algorithm according to the expected giveaway value, as follows:

| 3 wins | 5 wins | 7 wins | 15 wins | 30 wins | 40 wins | 200 wins | 300 wins | 400 wins |
|---|---|---|---|---|---|---|---|---|
| 90% | 80% | 70% | 60% | 50% | 40% | 30% | 20% | 10% |

In this case 3 wins at a 90% discount would save $15,417 and 400 wins at a 10% discount would save $1,730 which would be redeemed with a code at the time of purchase.

When reconciled by the winner shopper, the winner is linked to the administrator's website which in turn notifies the retailer and/or brand manager of the existence of the winner. Auditing procedures are established to confirm winner versus loser rates. In one embodiment, the exclusive game administrator is administrator@brandoodles.com. In another embodiment of the invention, both the administrator's website and the retailer's website (and perhaps the brand manager's website) are notified of the existence of a winner.

The invented method and system for promoting brand names is based on incentive. Retail outlet customers are induced to play the game embodied on their cash receipt/game piece when they see a well-known logo of a brand name guessing game.

Retailers are induced to participate in the invented method and system inasmuch as some of the advertising proceeds are funneled back to the retail outlets.

Example

Figure 3:
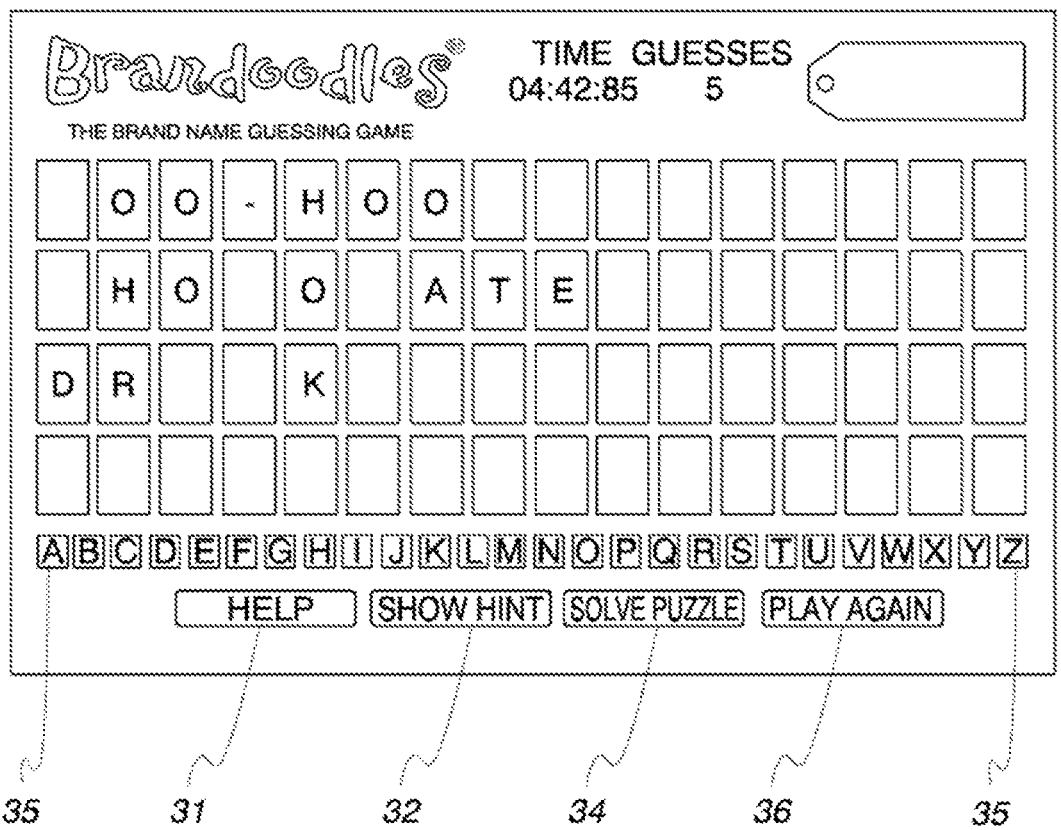
FIG. 3 depicts a sample screen pursuant to one embodiment of the invention.

Users of the invention can access commercially available copies of the Brandoodles® game system, or similar system at several game stores or outlets via a web search or physical search of "big box" retail locations. For example, the latest electronic form of an embodiment of the invention can be found online. The source code of the splash screen (FIG. 3) of this web based embodiment is included below as Appendix A. The screen features a plurality of play toggles 31-36 the toggles designed to actuate the game. A panel 35 of letters is provided to allow the user to try and guess the letters associated with the brand name depicted.

The Player's board is an interactive platform that will generate hash algorithm applications of alpha characters based on a random generator with a fixed or variable value. The fixed value may be 26—representing the number of letters in the English alphabet. The fixed value may be 30—representing the number of letters in the Spanish alphabet. The fixed value may be variable with different languages with additional subsets of characters. Hence, If the brand in question being used is designated as having four words, a brand example may be: TROPICANA PREMIUM ORANGE JUICE. This brand possesses 4 words with 30 characters, the game piece generator may produce a possible $(26)^4$ power or a possible randomization of 456,976 combinations of words revealed on each surface that the game is being played, such as the Actual Final Result shown:

| T | R | O | P | I | C | A | N | A |
|---|---|---|---|---|---|---|---|---|
| P | R | E | M | I | U | M | | |
| O | R | A | N | G | E | | | |
| J | U | I | C | E | | | | |

The Random Generator would show each result differently as shown on each surface such as:

| T | | O | | I | C | | N | A |
|---|---|---|---|---|---|---|---|---|
| | R | | M | | U | M | | |
| O | R | | N | | E | | | |
| | | I | | C | E | | | |

And again in every instance as shown here:

| T | | O | P | | | | A | A |
|---|---|---|---|---|---|---|---|---|
| P | | E | | I | | U | M | |
| O | | A | | | G | E | | |
| J | U | | C | | | | | |

The uniqueness of this generation is that no two game sets will appear alike on any surface of the smart phone, computer or other intelligent device, hence, the randomization will also apply to the output on every cash register receipt as different.

Overview of Operation

Figure 4:
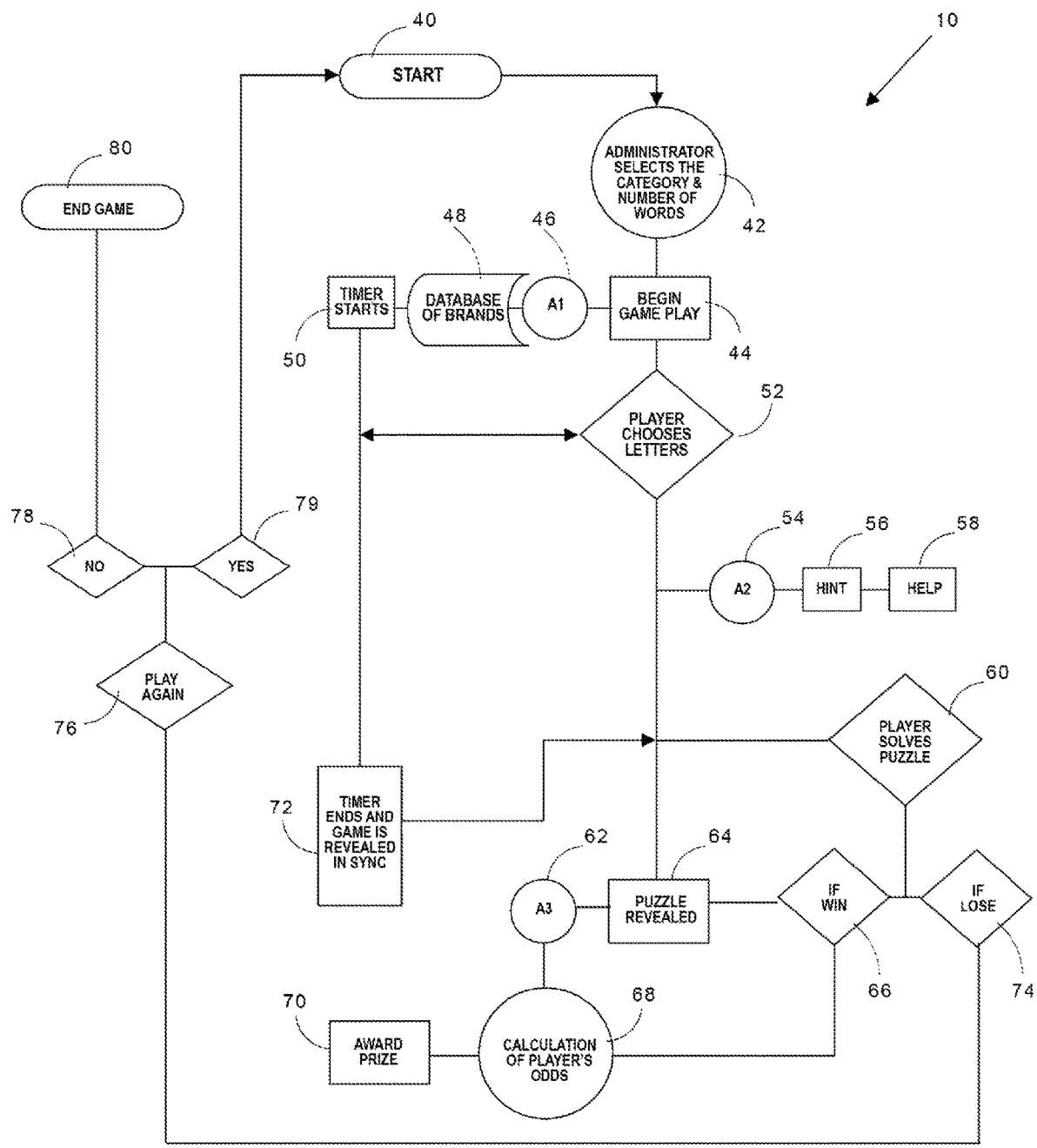
FIG. 4 depicts a flow chart of operations of one aspect of one embodiment of the invention.

Turning to FIG. 4, depicted therein is an overview of the details of the operation of one embodiment 10 of the system.

The game begins at stage 40. In one embodiment the game enters stage 40 when a buyer completes a transaction at a point of sale terminal and is issued a printed receipt with a game piece showing letters and a code to enter. Example of such receipts are shown herein. In another embodiment, the game enters the start 40 phase when an end user visits a website which includes an electronic display of the game 10.

In the embodiment shown in FIG. 4, in order for the game to proceed from the start state 40 to the begin gameplay state 44, an administrator must elect the category and the number of words to be used in the game 10. In the embodiment shown in FIG. 4, the administrator choices are performed independently of the user playing the game, and this step will occur before a game begins at state 44. The administrator of the game performing the administrative duties of state 42 can make changes to the game concurrently with a number of players, as the information about a particular promotion is stored within the system independently of any players' actions.

Once at least one category and words are chosen in the administrative step 42, the gameplay can begin at the gameplay state 44.

For embodiments where a player was not provided with a preprinted receipt, the system 10 performs a random game piece generator at randomizing state 46. The algorithm at the randomizing state 46 generates unique individual random choices from amongst letters of the alphabet that will appear on the four individual rows of data. Again, in an embodiment where the player has received a pre-printed game piece on a receipt, at state 46 does not generate a new game piece. The randomization state 46 references a database of brands 48 to generate the random puzzle board.

Once the puzzle board is either generated, or an existing one is used from a receipt, a timer 50 starts. The system 10 then proceeds to allow the user to select letters at state 52. As shown in the remaining figures, the user is provided with a letter board and is asked to fill in missing letters from the game piece. The letter choosing state 52 is limited by the timer 50.

During the letter choosing state 52, the system 10 also selects a number of letters for the specific game board in play at help state 54. In the help state 54 the system selects unique random choices from among the letters of the alphabet appearing on a single individual row to choose up to seven hints of letters that have not yet appeared in the row of data. The help state 54 provides both the random hints 56 randomly selected at the help state 54 and the actual instructions for the player at the instructions state 58.

During the letter choosing state 52 the player will fill in the letters of the game piece either by choosing letters directly or by using the assistance of the help state 54. If all the letters are revealed by the end user or the end user wishes to solve the puzzle early, the system 10 moves to the solve state 60. In the solve state 60 the timer 50 is stopped and the end user is asked to fill any all the remaining letters. The proposed solution is then submitted to the system 10.

The system 10 then decides whether the proposed solution is considered a win 66 or a loss 74. In one embodiment the system 10 determines that a system is a win 66 if all the letters match exactly the puzzle. In another embodiment, the embodiment 66 will accept phonetic equivalents of the puzzle solution and therefore will consider a proposed solution 60 a win 66 even if some of the letters are not exactly correct. For example, in some instances a particular puzzle may comprise a product name which has alternative spellings, such as one in French and English or English and Spanish.

If a proposed solution is determined to be a winning solution at state 66, the puzzle is revealed at the revelation step 64. The system then proceeds to the prize calculation step 62. The details of the calculation step 62, and other algorithms described below, are presented in the algorithm in Appendix C. At the prize calculation step 62, the system 10 calculates the player's odds based on the value of the prize and number of players and awards a quantity in each percentile value. Once the prize calculation step 62 assigns a prize to the winning game, the game proceeds to calculate the particular player's odds 68. Finally, the game 10 proceeds to the prize award state 70.

As shown in FIG. 4 while the player is solving the puzzle 60 the timer 50 continues to run. If the game enters the timer ended state 72, the player is given one more chance of solving the puzzle at state 60.

If upon submitting a solution at state 60 the system 10 determines that the proposed solution is incorrect, the system moves to the incorrect state 74. The player is offered an opportunity to play the game again at state 76. If the player agrees to play the game again at state 79, the system 10 returns to the begin state 40. If the player chooses to not play again at state 78, the game ends 80.

In one embodiment the choice to play again at the play again state 76 is offered to the player only if the player has not repeated plays an excessive number of times in a given time period. In another embodiment, the play again state 76 will only provide the option to repeat gameplay if the system administrator at the administration step 42 has entered additional puzzles for the end user.

In one embodiment, the end user who started game play using a printed receipt will only be able to repeat games using the products reflected on the player's receipt. In this case, the interaction between the database of brands 48 and the selection algorithm 46 also interacts with the receipt information gathered in the begin state 40.

As can be appreciated from FIG. 4, the system 10 provides for a method of generating and completion of puzzles, including puzzles that relate to a database of brand names 48.

Transaction Receipt Numbers

Figure 5:
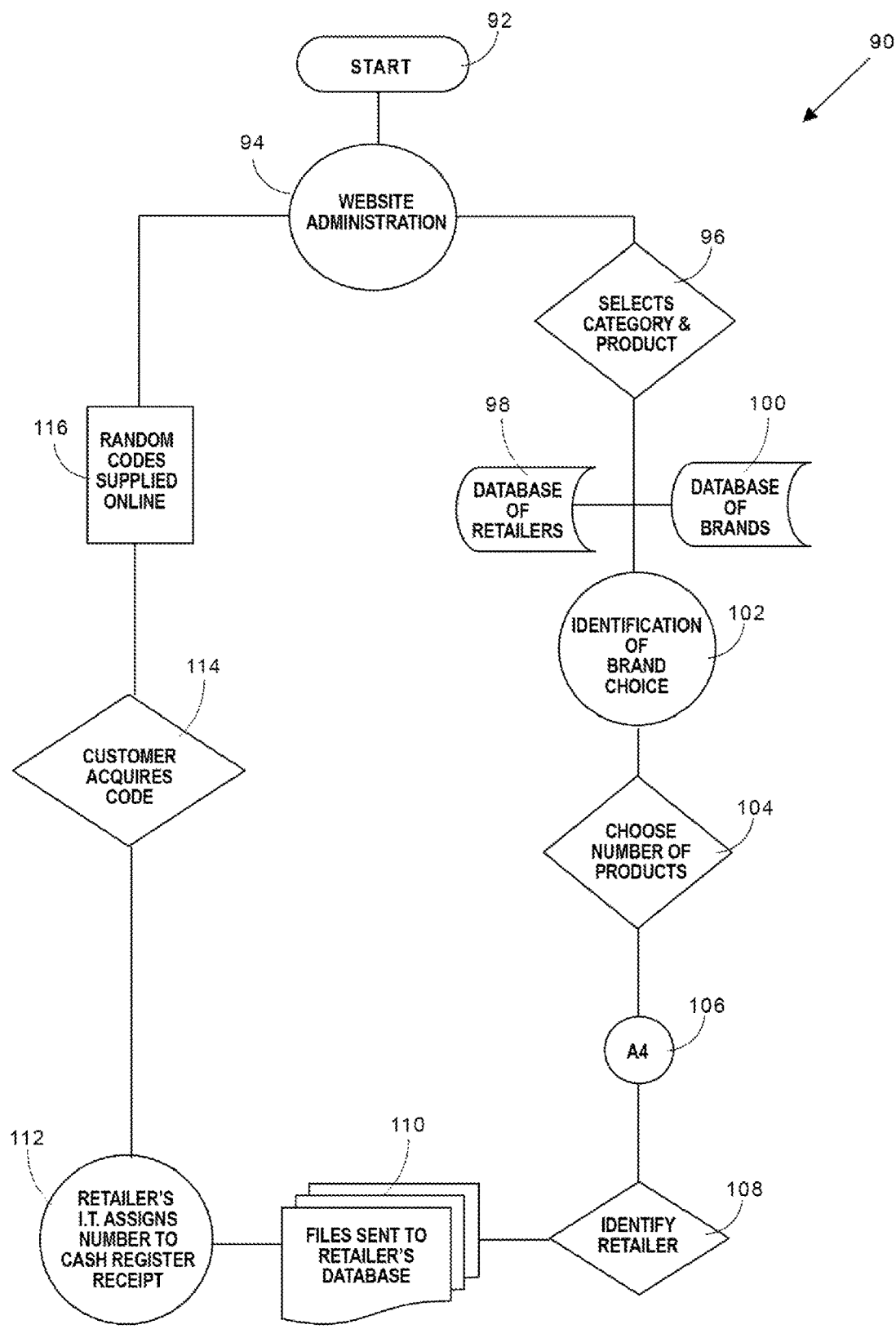
FIG. 5 depicts a flow chart of operations of one aspect of one embodiment of the invention.

Turning to the flowchart of FIG. 5 depicted therein is a schematic for the process of selecting random numbers which act as transaction receipt numbers. In one embodiment, the transaction receipts are cash register receipts. In another embodiment, the transaction receipts take the form of electronic or other form of purchase confirmation.

As explained herein, the system 10 includes a game piece attached to a receipt, such as the sample receipt shown in FIG. 2. The receipt includes a redemption code 14. The steps of assigning the code and related tasks, per one embodiment 90, are shown in FIG. 5.

The process 90 begins at a start state 92. The start state 92 comprises a website administration portal 94 in one embodiment. As part of the website administrator portal 94 the system administrator can select a product category and product names 96. The selection of product information 96 results in updates to the database of retailers 98 and the database of brands 100. Once the databases 98, 100 are updated, the system administrator can select the brand which will be shown the to end user as part of the promotion as part of step 102. The administrator can also chose the number of products 104 that will be subject to the promotion.

Once the brands 102 and the products 104 are chosen, the system 90 assigns the random alphanumeric codes at step 106. The randomization step 106 processes and assigns random alphanumeric codes that are transmitted to the cash register receipt.

Once the randomization step 106 is completed the system 90 proceeds to identify a retailer 108 which will use a particular set of puzzles for products. In one embodiment, as part of selecting the retailer 108, the system will also include metadata regarding the promotion, including the start time and end time as well as the start date and end date for each potential promotion.

Once the target retailers are identified 108, the promotions and all related metadata are sent to the retailer's database in step 110.

Concurrently with adding brand and product choices, the administrators 94 can observe when random codes are redeemed online using interface 116. Random codes are assigned 112 from the retailer's database 110 by the retailer's IT system. The assignments 112 connect a particular redemption code to the receipt and it is acquired by the customer 114. The administrators 94 can see how the codes are redeemed 116 as part of the game starting process 40 shown in FIG. 4.

While the various data stores such as the databases 110, 98, 100 are depicted as separate objects in the flow chart in FIG. 5, in one embodiment the data stores are located on a single computer which comprises the embodiment of the system 90. Further while the data stores are shown as distinct databases in the FIG. 5, in various embodiments the databases are data entries in a single data store, either an organized database or other form of data storage, both organized and not. In one embodiment the data stores are implemented using a distributed data store such as a blockchain record store.

Game Play Opening Step

Figure 6:
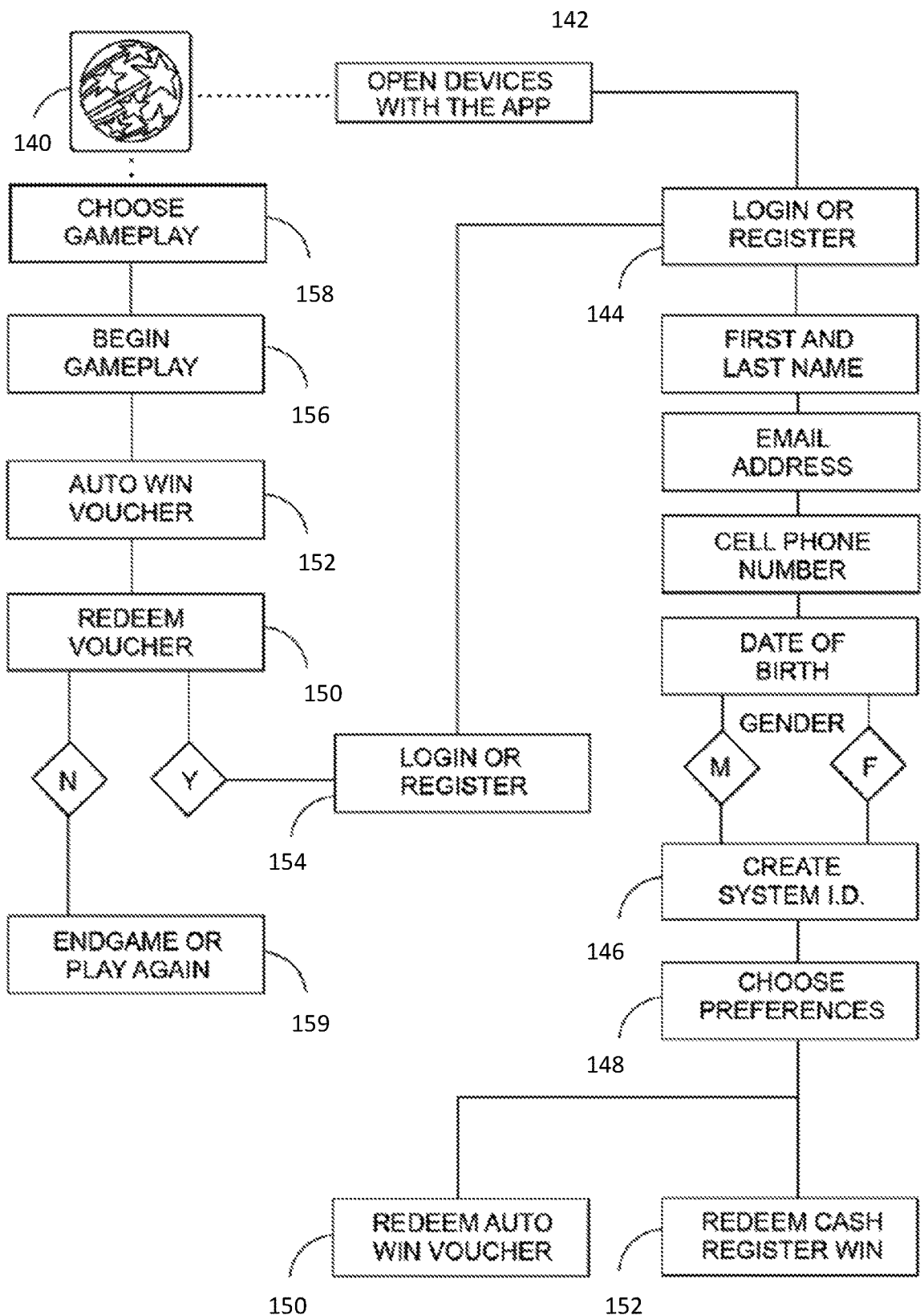
FIG. 6 depicts a flow chart of operations of one aspect of one embodiment of the invention.

Turning to FIG. 6 depicted therein is a flow chart of the game play opening steps. The game play begins with the game software 140 being invoked on one or more devices 142.

To begin playing, the end user must register or log in to the game using the login step 144. To register, the end user must provide identifying information such as first and last name as well the email address, a phone number, date of birth, and gender, in the depicted embodiment. Once the end user provides the identifying information, the end user can create a username for the system at step 146. After creating the username, the end user can choose preferences 148 and either redeem a cash register or point of sale wining code 148 or redeem an automatic winning voucher 150.

If after establishing a username the end user successfully logs into the system in order to play 154, the end user can redeem one or more the vouchers 150, 152 or begin playing the game 156. The end user can select one or more game play styles 158, each of which is described herein. As discussed in this application, the end user may play multiple games and can, in some instances, repeatedly play the promotional games. However, if the player chooses not to play the game, the system 140 will end the game and log the end user out at stage 159.

Figure 7:
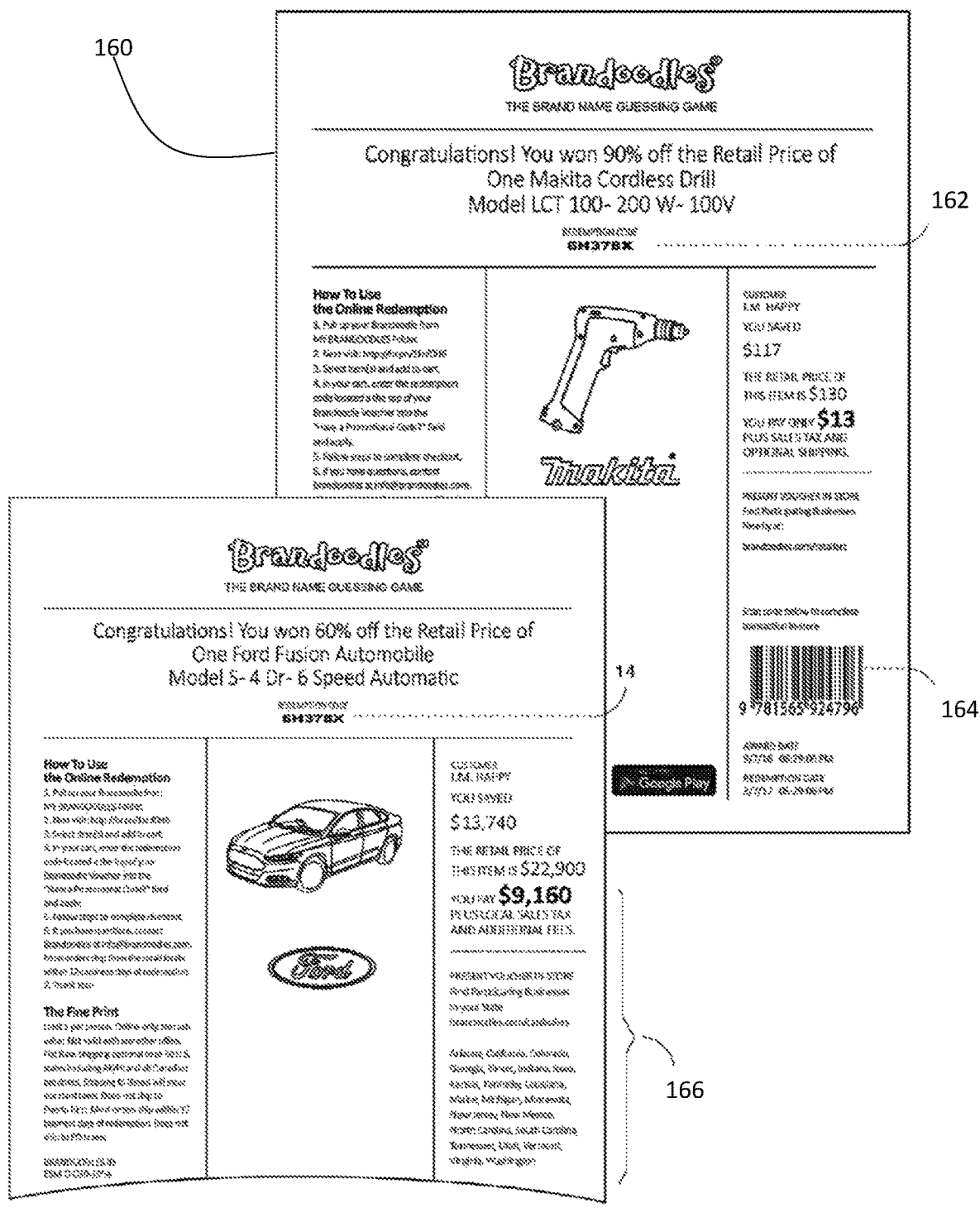
FIG. 7 depicts example vouchers used in conjunction with one embodiment of the invention.

Turning to FIG. 7, depicted therein are several winning vouchers as described in steps 150, 152. The example voucher 160 includes a redemption code 162 and a UPC code 164. The UPC code can be used in a point of sale terminal. For awards that do not involve a point of sale terminal, other redemption instructions 166 will be used, as is the case with the instructions for a promotion of a vehicle's price shown in FIG. 7.

Figure 8:
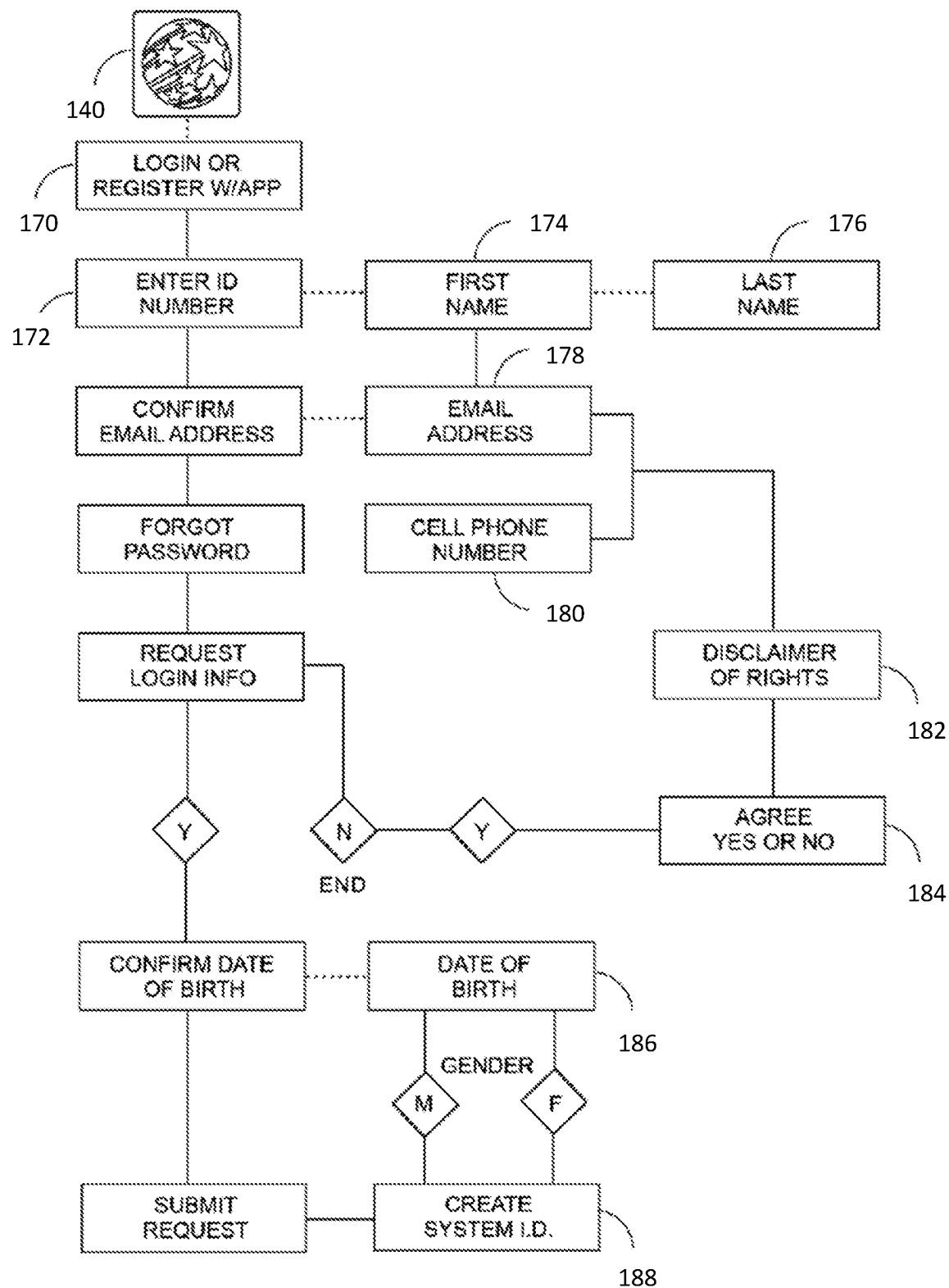
FIG. 8 depicts a flow chart of operations of one aspect of one embodiment of the invention.

FIG. 8 in turn depicts the details for the registration and login process 170 which is invoked from the application 140. The login process 170 allows the end user to log in using a unique identification number 172. In order to finalize the account the end user must also provide a first name 174 and a last name 176 and an email address 178. The email address is confirmed. The end user also provides a cell phone number 180.

When the end user logs into the system and confirms their email address the end user may reset their password or proceed to log in to the system and request login information.

As part of the account set process and log in process the end user must also review the terms and the disclaimer 182 and agree 184 to the process of the using the application 140.

As the game 140 requires the date of birth for its players, the log in process requests that the players confirm the date of birth and provide the date of birth 186 when necessary. Further, as the promotions are often gender specific, the gender information is also collected from the end user.

In one embodiment, the step of requesting the date of birth 186 comprises asking the end user to select a date range representing end user ages, instead of requesting the specific date of birth. In another embodiment, the step of requesting the date of birth 186 comprises requesting the specific birthday but not year. In this case the system is able to provide the end user promotions relating to the end users' birthday, but without requiring the exact birth year for every end user. In one embodiment, the end user is provided with a range of incentives to provide the birth year and birthday information, such as a promise of additional promotions if birthday and year information is given.

The conclusion of the process is the creation of a system identifier 188 which allows the end user to interact with the system.

Figure 9:
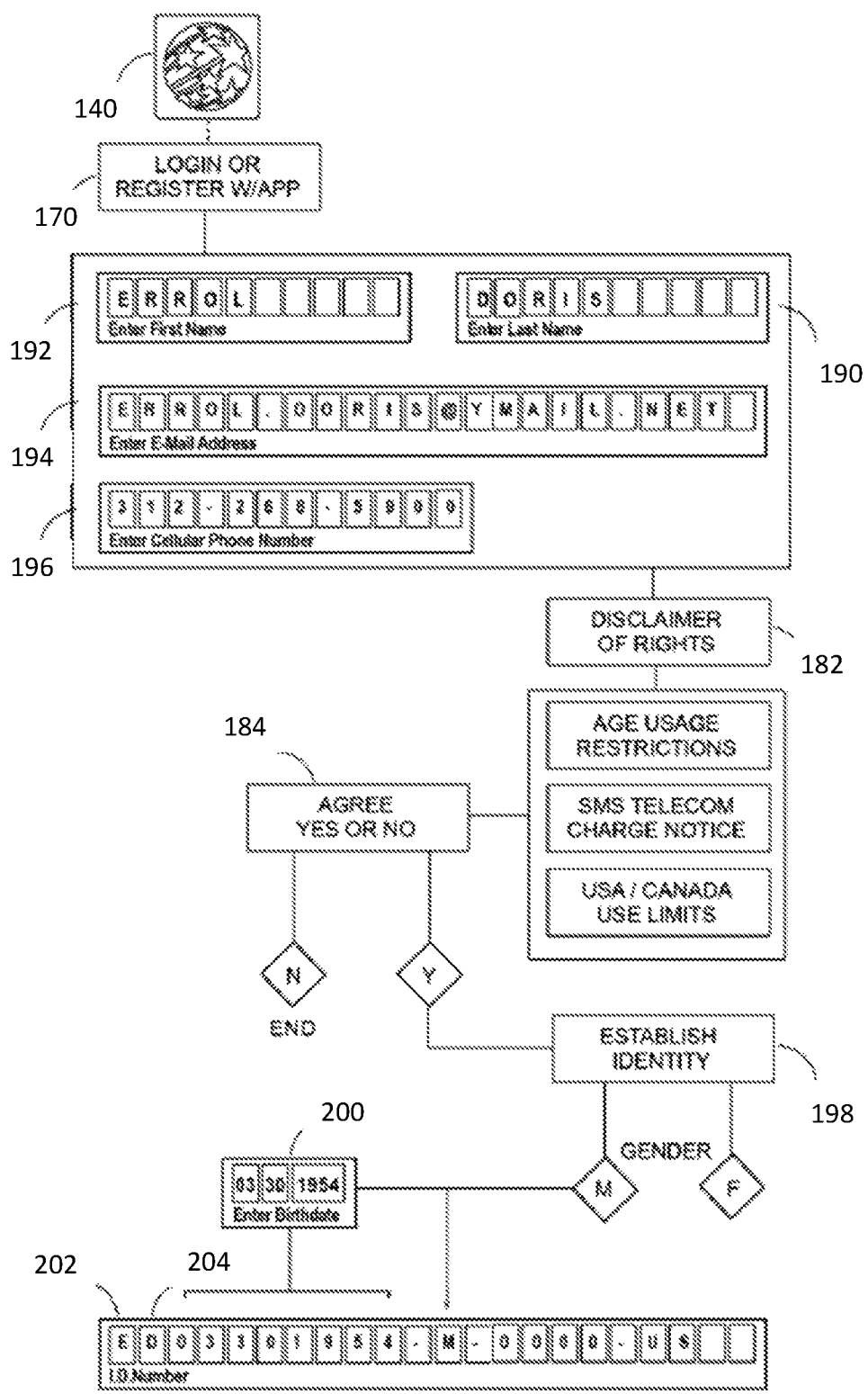
FIG. 9 depicts a sample interface for one embodiment of the invention.

FIG. 9 in turn depicts several interfaces for the game 140 to login and register in the system. The login in steps 170 are depicted in the interface 190. The interface accepts from the user the name 192, email address 194, and phone number 196 using a similar look and feel as the game pieces shown to the end user during actual game play.

Once the fields of the interface 190 are completed, the system proceeds to the disclaimer of rights 182 and other steps as shown in FIGS. 8 and 9. In conjunction with the age usage restrictions, the system also display specific notices about cell phone restrictions and regulatory notices such as limits of promotional games in Canada. The end user is provided an opportunity to agree to the various terms and restrictions 184. If the end user agrees to continue, the system will establish an identity for the user 198. The end user will then be provided with an interface to confirm the birthdate 200. Finally, the end user will see their assigned system identifier 202. In the embodiment shown in FIG. 9, the identifier comprises the initials, an encoded birthdate, a flag for the gender, and an incremental counter, as well as a country identifier.

In another embodiment the identifier 202 includes a random number. In yet another embodiment the identifier is simply a random number not already assigned an existing user.

Figure 10:
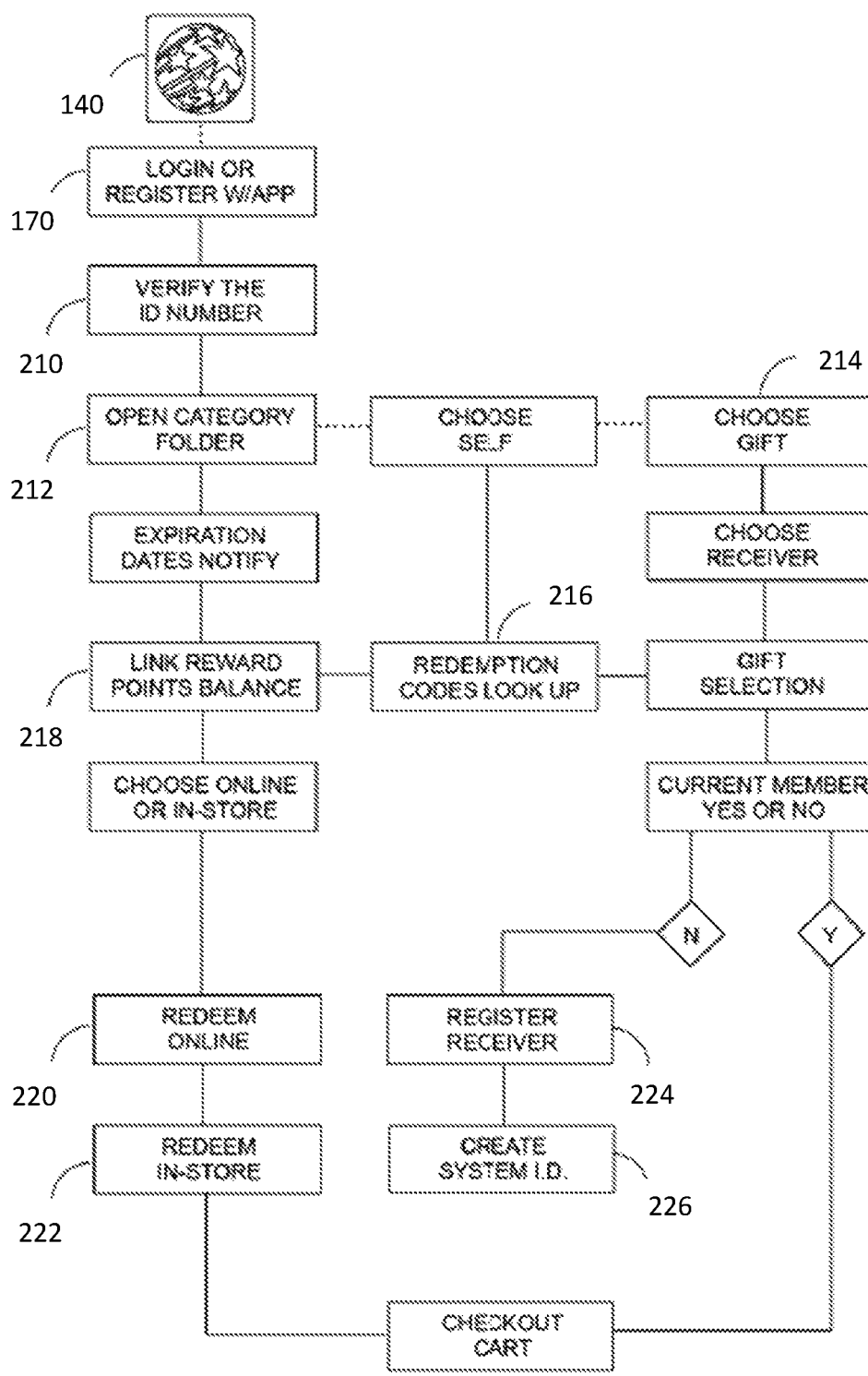
FIG. 10 depicts a flow chart of operations of one aspect of one embodiment of the invention.

FIG. 10 depicts another login or registration process. In this process the application 140 login 170 accepts as input an identification number which is verified 210 by the application 140. The identification number which is verified originates from a third party, such as a point of sale purchase, a loyalty rewards program, or others. The verified 210 identifier represents a category of rewards 212 such as a discount code or an instant prize. The expiration date of the identification number is confirmed. The end user may apply the identified reward as a gift 214 to a third party or to redeem it 216 for that particular user.

Regardless of whether it is to the end user's account or to a third party account as a gift, the reward points are applied to a balance 218. The balance 218 is redeemed online 220 or in-store 222. In either case, the final transaction ends in checkout of the purchase including the awarded claim.

If the beneficiary of the verified identifier 210 is not currently a member of the system 140 the registration information may be received 224 by the system 140 and the system identifier 226 may be created as described above before any redemption occurs.

Figure 11:
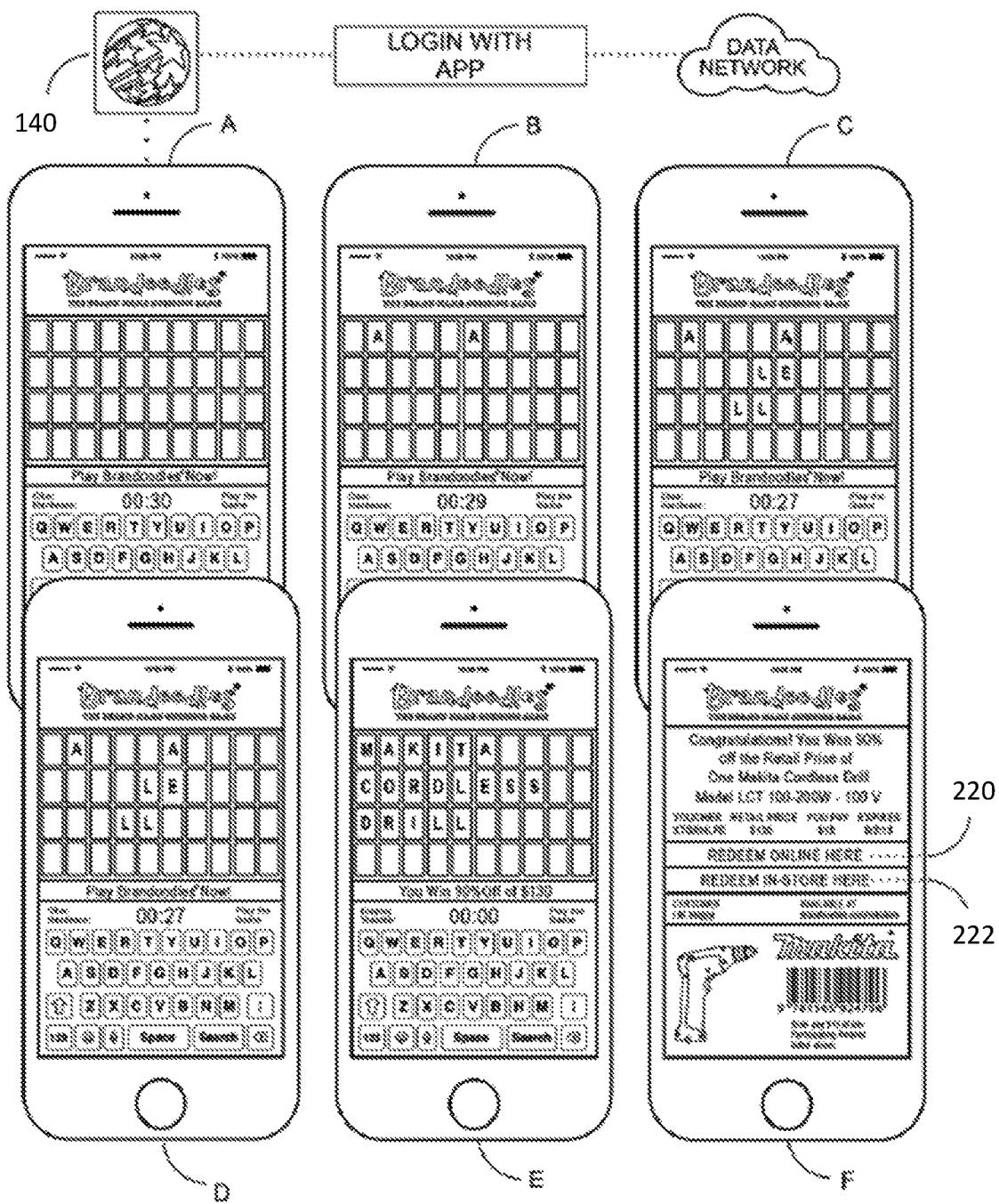
FIG. 11 depicts stages of gameplay of one embodiment of the invention.

Turning to FIG. 11, depicted therein are several example interfaces of the system 140. The interfaces shown depict the game play steps A-F up to and including providing the end user the option to redeem the code online 220 or in-store 222.

Dashboards

Figure 12:
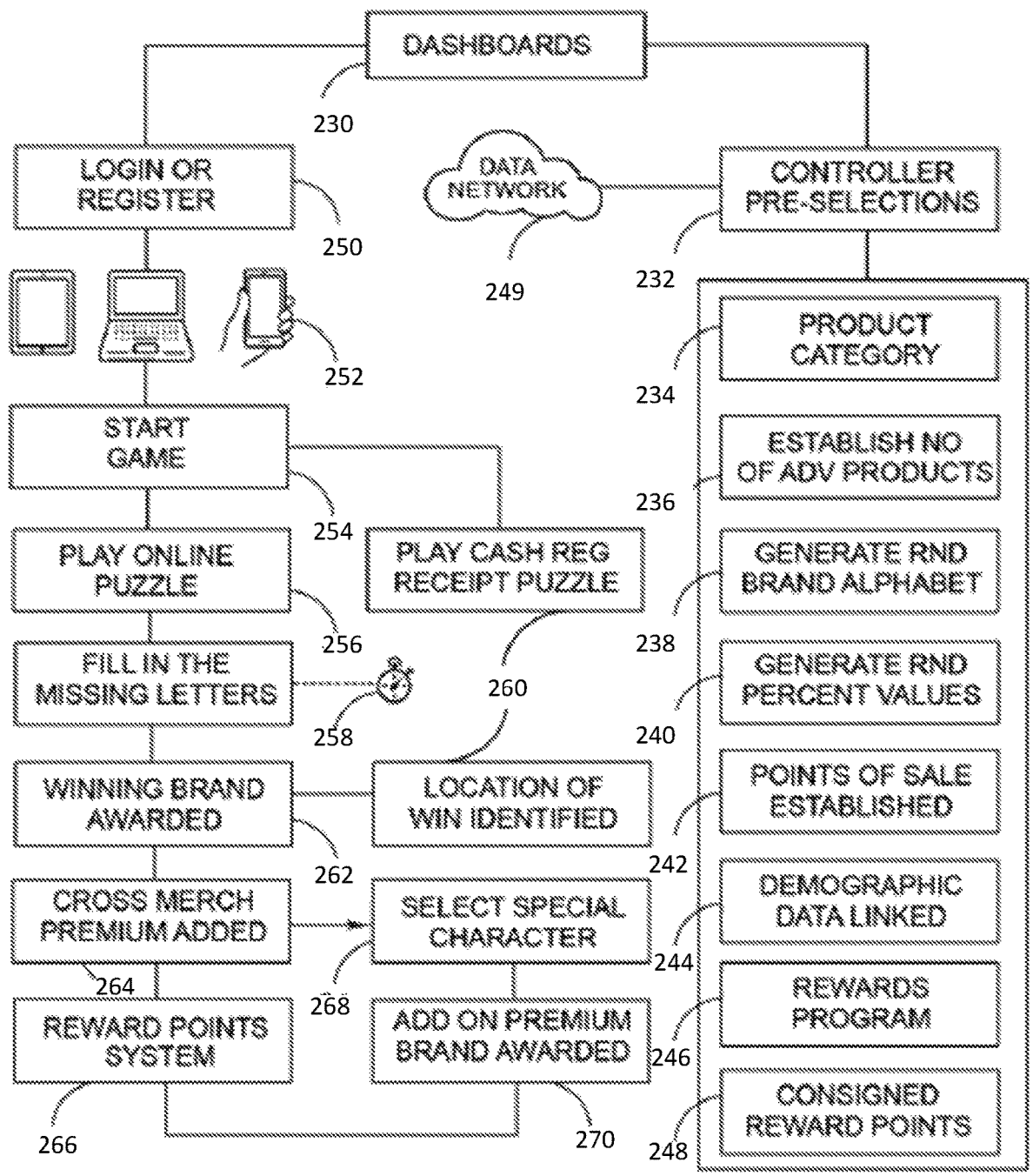
FIG. 12 depicts a flow chart of operations of one aspect of one embodiment of the invention.

FIG. 12 depicts the operational details of an interface or dashboards 230. One dashboard 232 contains information about the controller of the game including making preselections for promotions. The controller dashboard 232 interacts with the data network 249 to communicate with one or more data stores containing information about the game. The dashboard 232 includes information about each product category 234, the number of products 234 and a brand alphabet 236. The system also generates the random brand alphabet 238, the random percentage values 240. The points of sale 242 are established. The demographic data 244 is liked to particular promotions and rewards program 246 data is also linked to promotions. Finally, participants are consigned reward points 248.

The dashboard 230 also includes a means for the end user to login or register 250 using a tablet, laptop or handheld computing device 252. The end user can begin a game 254. The game can involve a cash register or point of sale receipt puzzle 260 or where the end user begins the puzzle from an online game source 256. The end user must fill in the missing letters during the available time period set by a timer 258. The winning brand is awarded 262 with cross merchandizing premium added 264, if earned. The cross merchandising premium is unlocked by accessing a special character 268 in the puzzle board. The system involves award points 266 and an add on premium brand award 270, in one embodiment.

Figure 13:
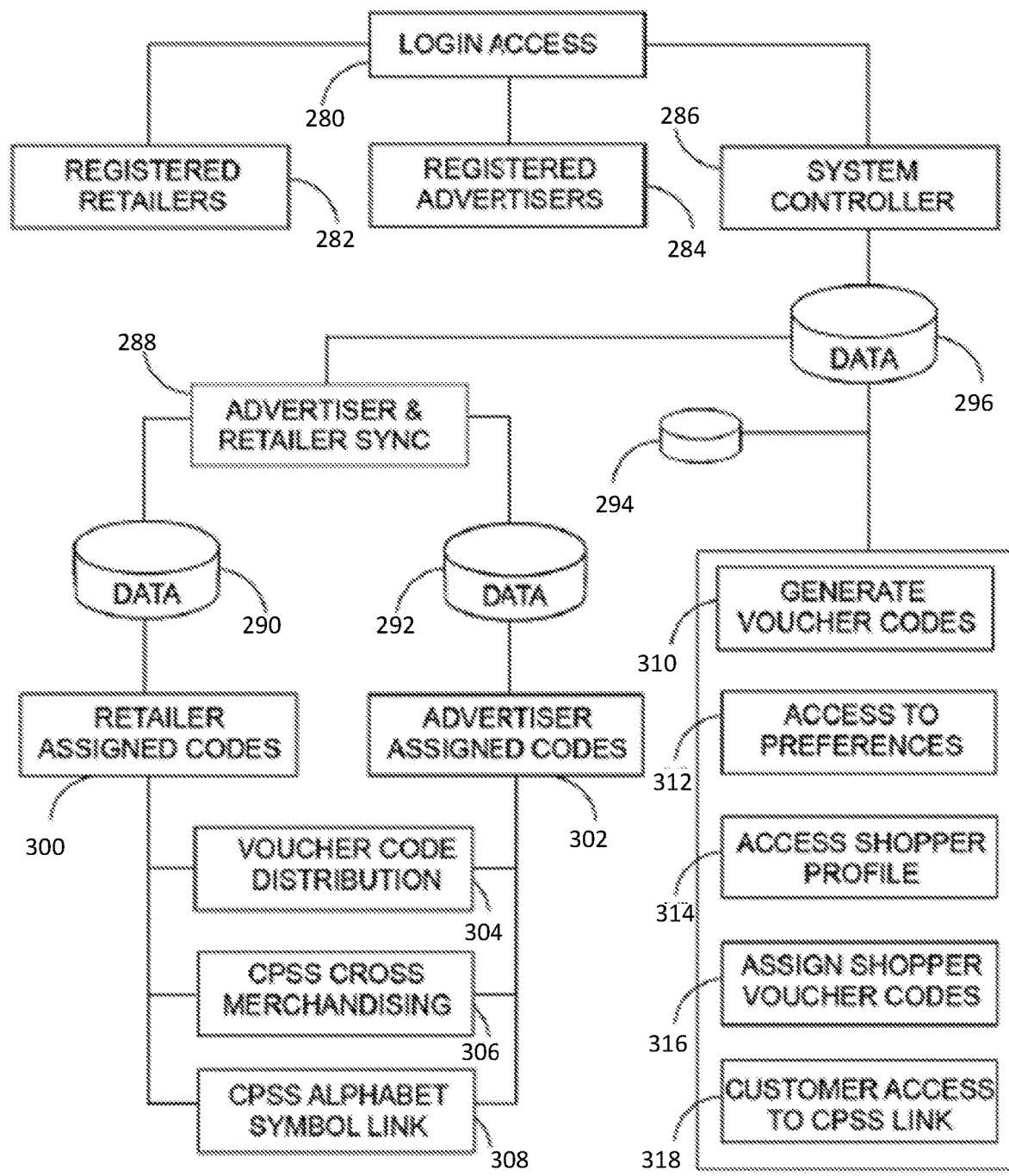
FIG. 13 depicts a flow chart of operations of one aspect of one embodiment of the invention.

A second set flowcharts for user dashboards are depicted in FIG. 13. The dashboards again require a login 280. The entities that can log in to the system using this dashboard 280 include registered retailers 282 and registered advertisers 284. Once the retailers or advertisers are logged in the control of the system is transferred to a system controller 286. The system controller administers a number of data stores 296, 292, and 290. Some of the data stores, such as the data store 296 further includes subordinate data stores 294. This subordinate data store 294 will include reporting means, in one embodiment. In another embodiment, the subordinate data store 294 includes information about a single customer, including sensitive information such as personally identifiable information. As such the subordinate data store 294 is maintained as a separate entity from the primary data store 296.

As shown in FIG. 13, the advertiser and retailer data synchronizer 288 operates on the retailer and advertiser data stores 290, 292. The retailer data store 290 includes retailer assigned codes 300. The advertiser data store 292 includes advertiser assigned codes 302. The codes 300, 302 are used to cross link transactions including voucher code distribution 304, CPSS cross merchandising 306 and CPSS alphabet symbol linking 308, which are described below The main data store 296 is controlled by the system controller 286 and it includes tools to generate voucher codes 310, set access preferences 312. Further the main data store 296 includes the ability to access shopper profiles 314, shopper voucher codes 316 and for setting of customer access to CPSS link 318. The CPSS system is shown in detail in further figures and described below.

Example Interfaces

Figure 14:
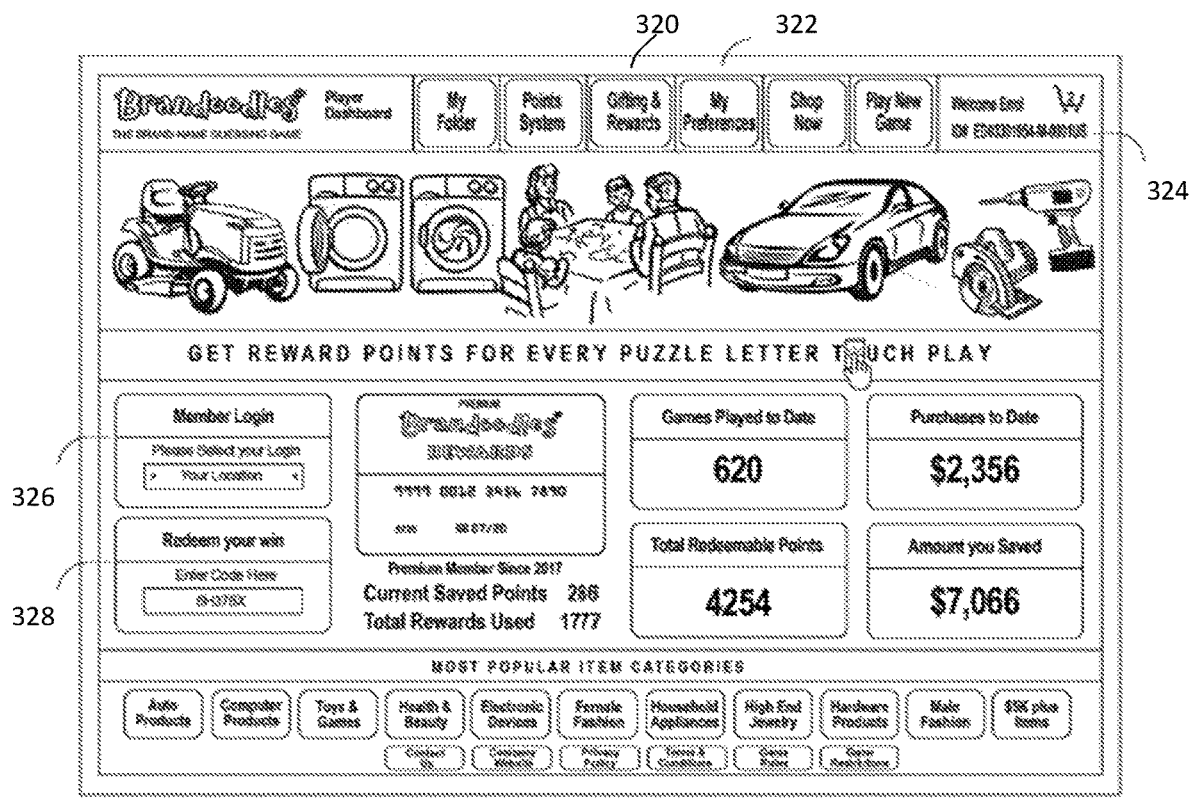
FIG. 14 depicts an example interface, per one embodiment of the invention.

Turning to FIG. 14, depicted therein is a sample interface 320 for a user of the system. The interface includes an action area 322 where the end user can select actions such as reviewing the points system, shopping for items, and other actions. The interface 320 also includes the end user's identifier 324 the process for which was discussed above. The interface 320 also allows the end user to log in to other areas of the system 326, such as if the end user also wanted to manage their own promotions. The interface 320 also allows the end user to redeem a winning code 328.

Figure 15:
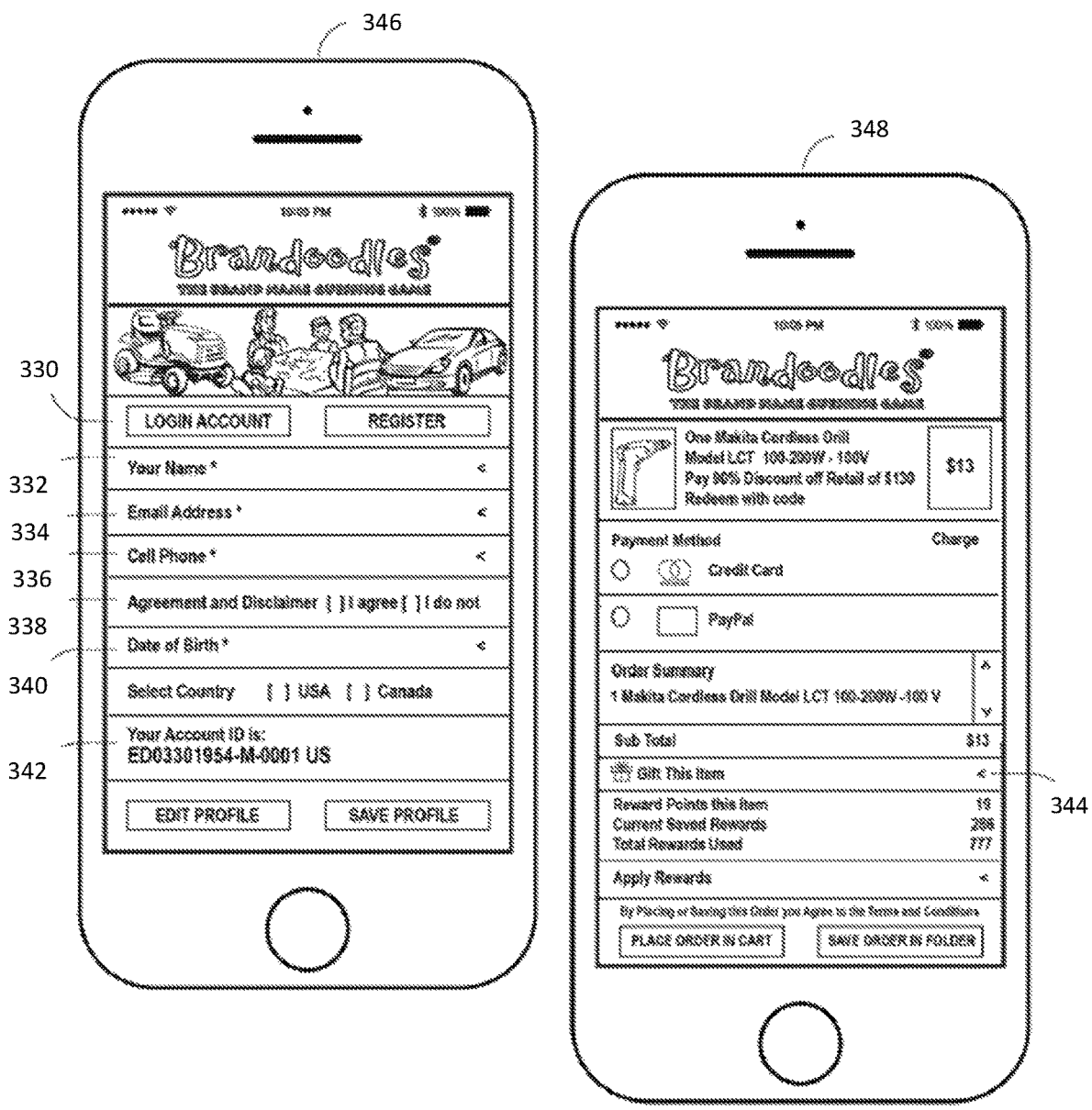
FIG. 15 depicts further example interfaces, per one embodiment of the invention.

FIG. 15 depicts two sample user interfaces. A first account setup interface 346 allows the end user to select an action 330 such as to log in or register. Presuming that the user has not previously registered with the system, the interface 346 allows the user to provide a name 332, email address 334, phone number 336, agree to terms and conditions 338 and provide a date of birth 340. Once the information is filled in a user id is generated 342 and the end user can proceed in the system.

A second interface is shown in FIG. 15, the second interface being for purchasing a discounted item 348. As part of the purchase, the end user may select the gift option 344, instead of buying the item for themselves.

Figure 16:
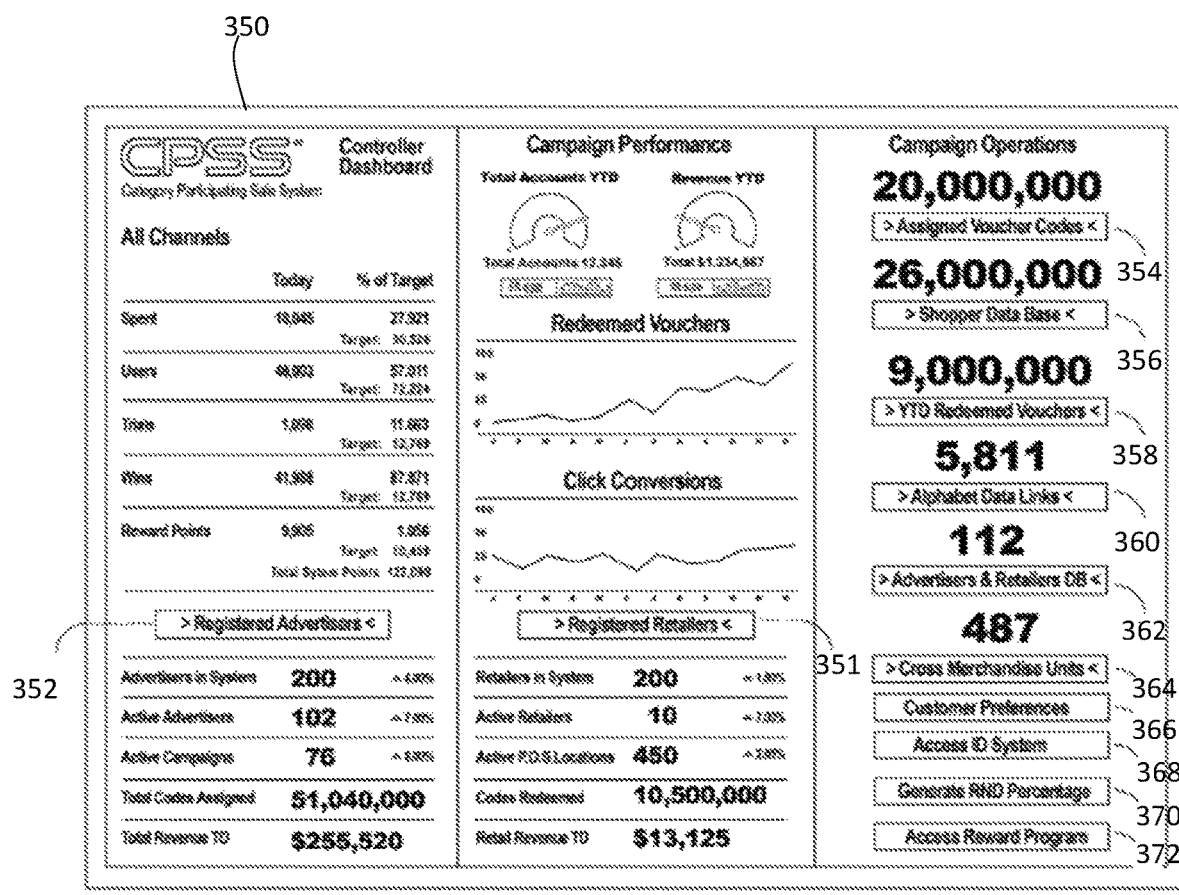
FIG. 16 depicts an example interface, per one embodiment of the invention.

A view of an interface 350 of the Category Participating Sale System (CPSS) is shown in FIG. 16. The system allows registered advertisers 352 to view information such as the number of active advertisers and the number of active campaigns. In turn, registered advertisers 351 can review campaign performance by accessing their portal. For a particular campaign, the advertiser can assign voucher codes 354, can review the shopper database 356, and the number of vouchers that have been redeemed year to date 358. The user of the CPSS can also view the alphabet data links 360 and the relevant sections of the advertisers and retailers database 362. Other features include the cross merchandise units link 364, the customer preferences link 366, the ID system 368 and the options for setting of random values 370. Finally, the user can access the reward program 372.

Figure 17:
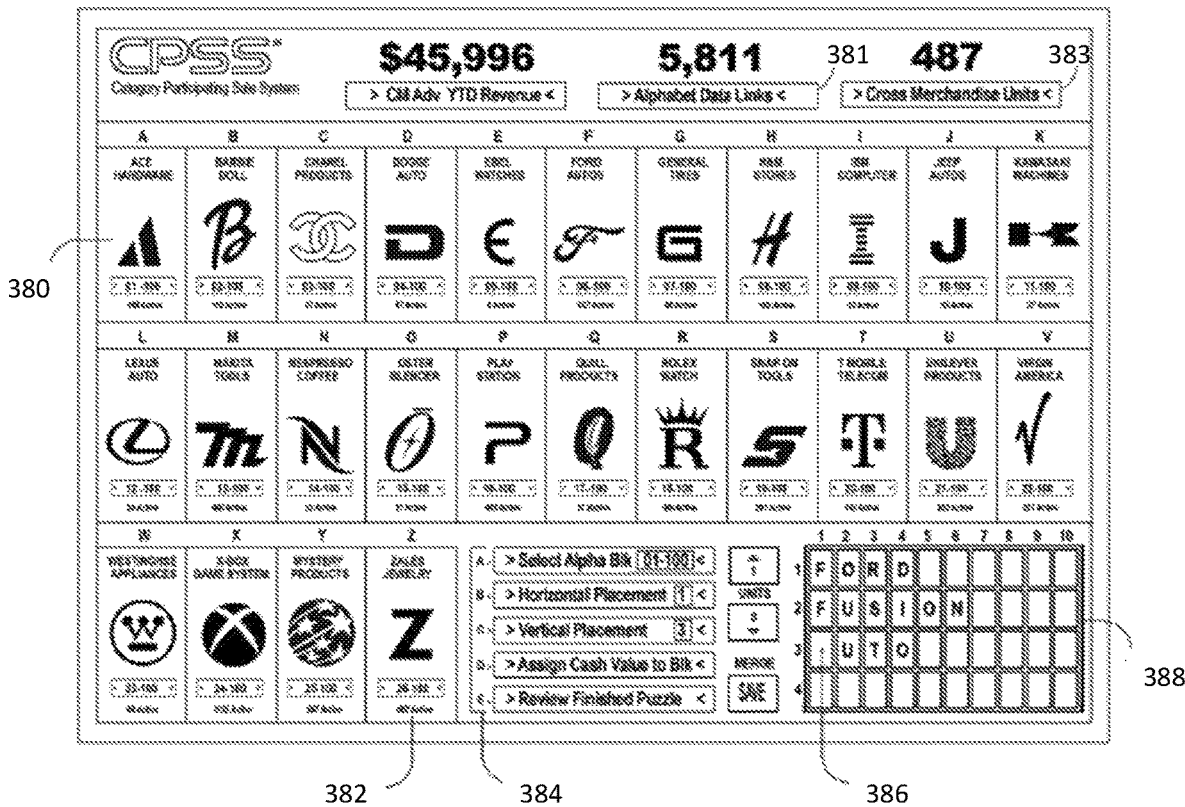
FIG. 17 depicts an example interface, per one embodiment of the invention.

The details of a sample interface of the CPSS cross merchandising interface is shown in FIG. 17. The interface includes areas to select brands for each letter 380 and a listing of the number of active promotions 382 for each brand. The end user may select a number of actions 384 including selecting an alphabet block, assigning cash values, and others. Puzzles with the selected brands for cross merchandising appear in the preview 388 of a puzzle board 386. For example, in the embodiment shown in FIG. 17, the missing A of the 'AUTO' puzzle will be filled in with the A in the logo for Ace Hardware and so selecting that letter will result in cross merchandising. The end user of the interface can view and change the alphabet data links 381 and review information about cross merchandising 383.

Figure 18:
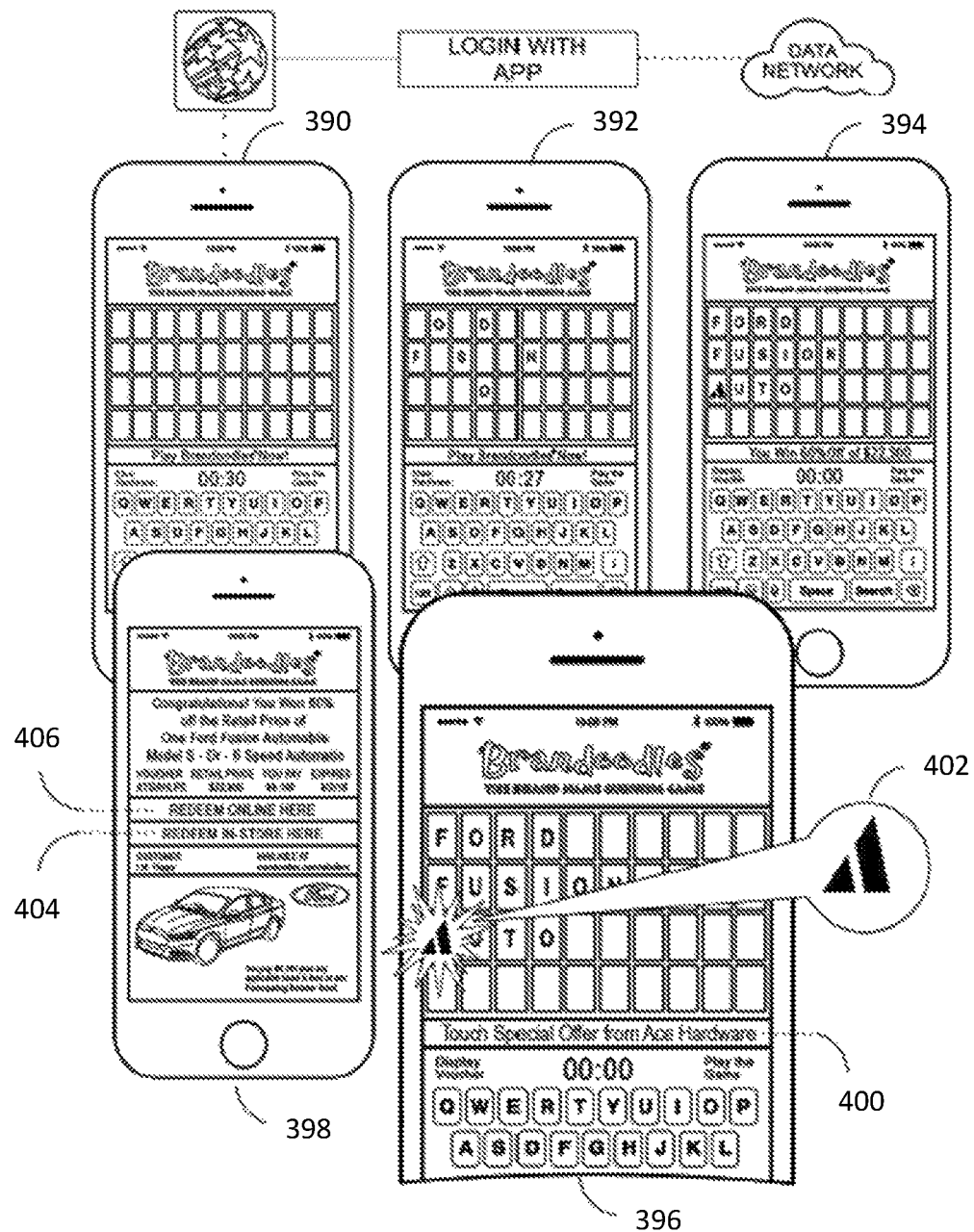
FIG. 18 depicts an example interface, per one embodiment of the invention.

Example output of the cross merchandising is shown in FIG. 18. The game begins with a blank board 390. A number of randomly selected letters are filled in at step 392. The end user select letters during game play 394. Selecting the A during stage 396 results in receiving a cross merchandising offer 400 from the retailer 402 associated with the specially designated letter. The end user also receives the main offer 398 such as the ability to redeem a discount either in store 404 or online 406.

Figure 19:
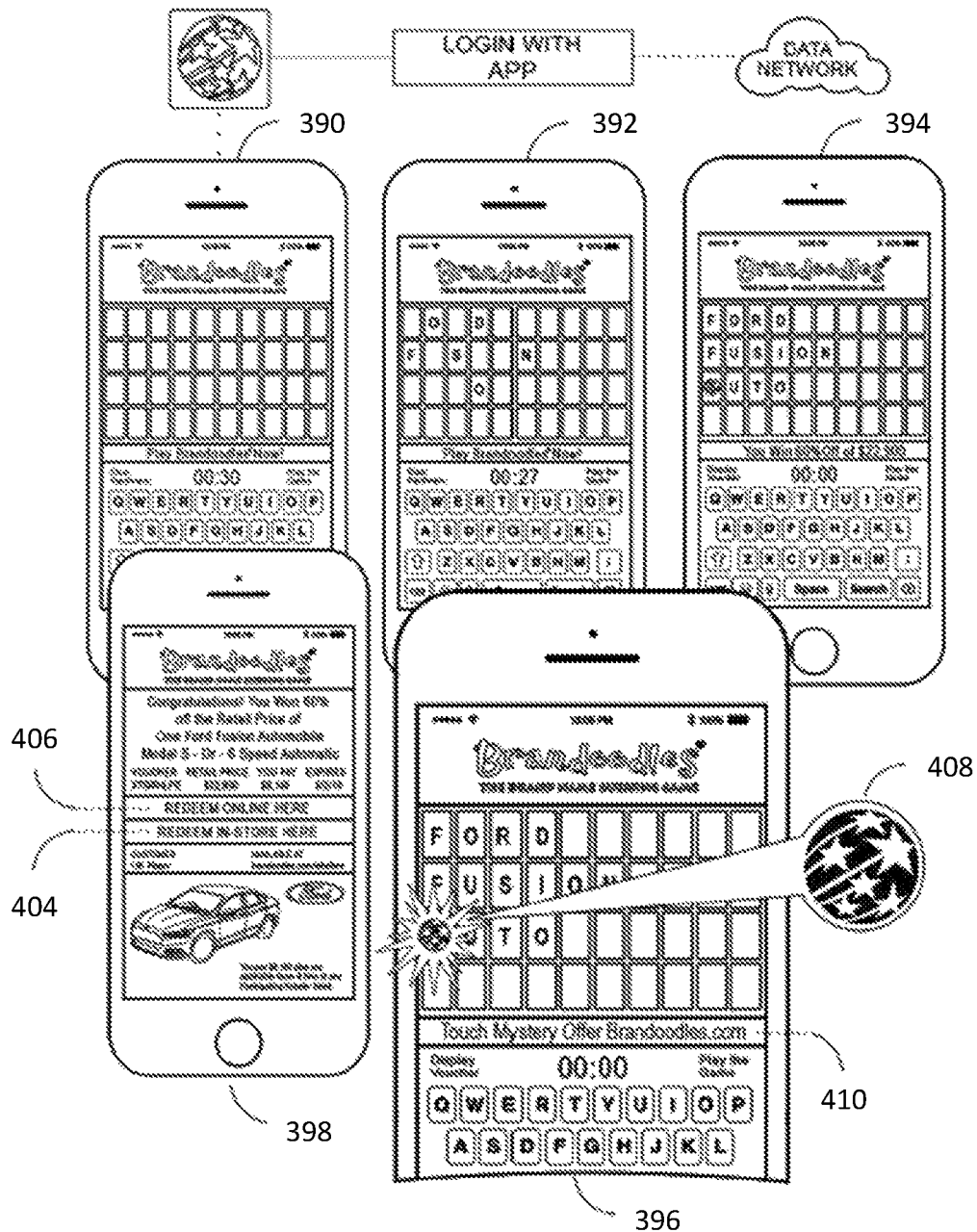
FIG. 19 depicts an example interface, per one embodiment of the invention.

A second alternative gameplay interface is shown in FIG. 19. In this embodiment, game again begins with a blank board 390. A number of randomly selected letters are filled in at step 392. The end user select letters during game play 394. Selecting the A during stage 396 results in receiving a mystery offer 408 from an unknown retailer 410. As before, the end user also receives the main offer 398 such as the ability to redeem a discount either in store 404 or online 406.

Figure 20:
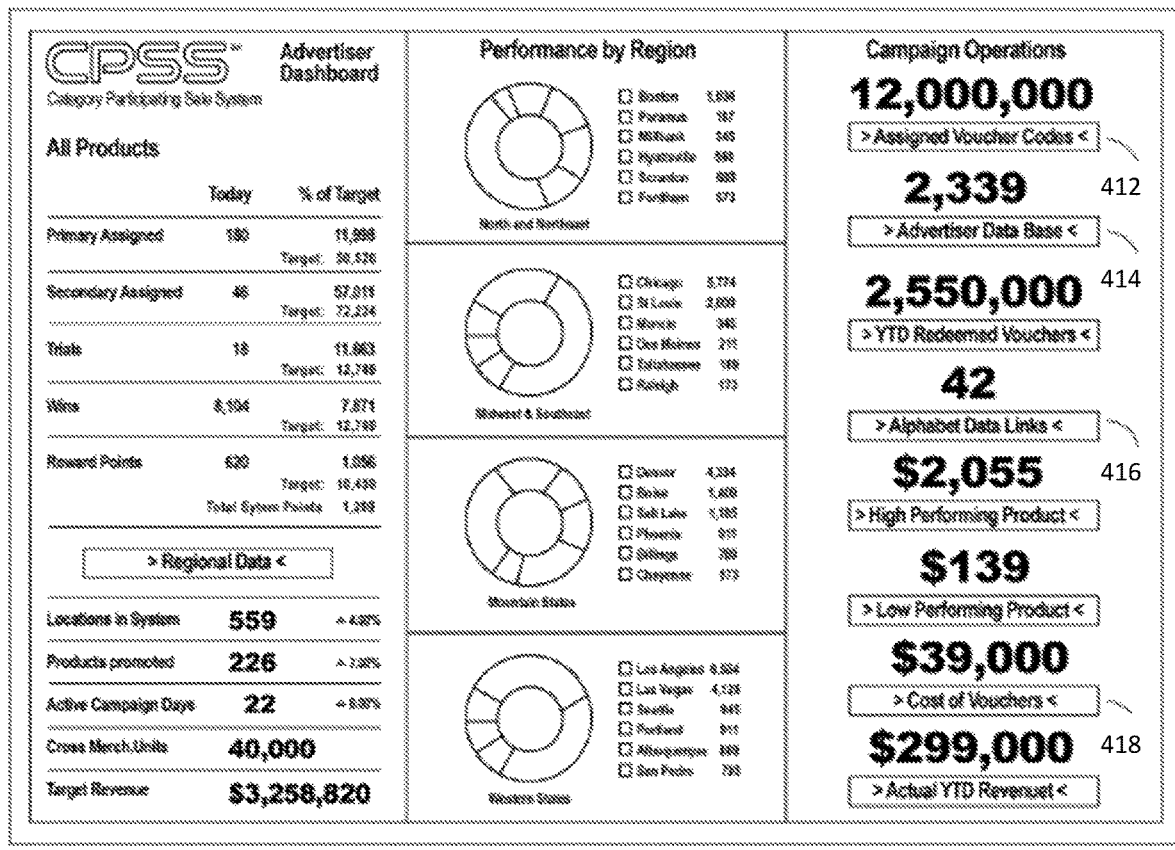
FIG. 20 depicts an example interface, per one embodiment of the invention.

Another interface is shown in FIG. 20. This interface shows another view of the CPSS module showing the number of assigned voucher codes 412, the database of advertisers 414 and the number of special alphabet links 416 and the total cost of the vouchers 418.

Figure 21:
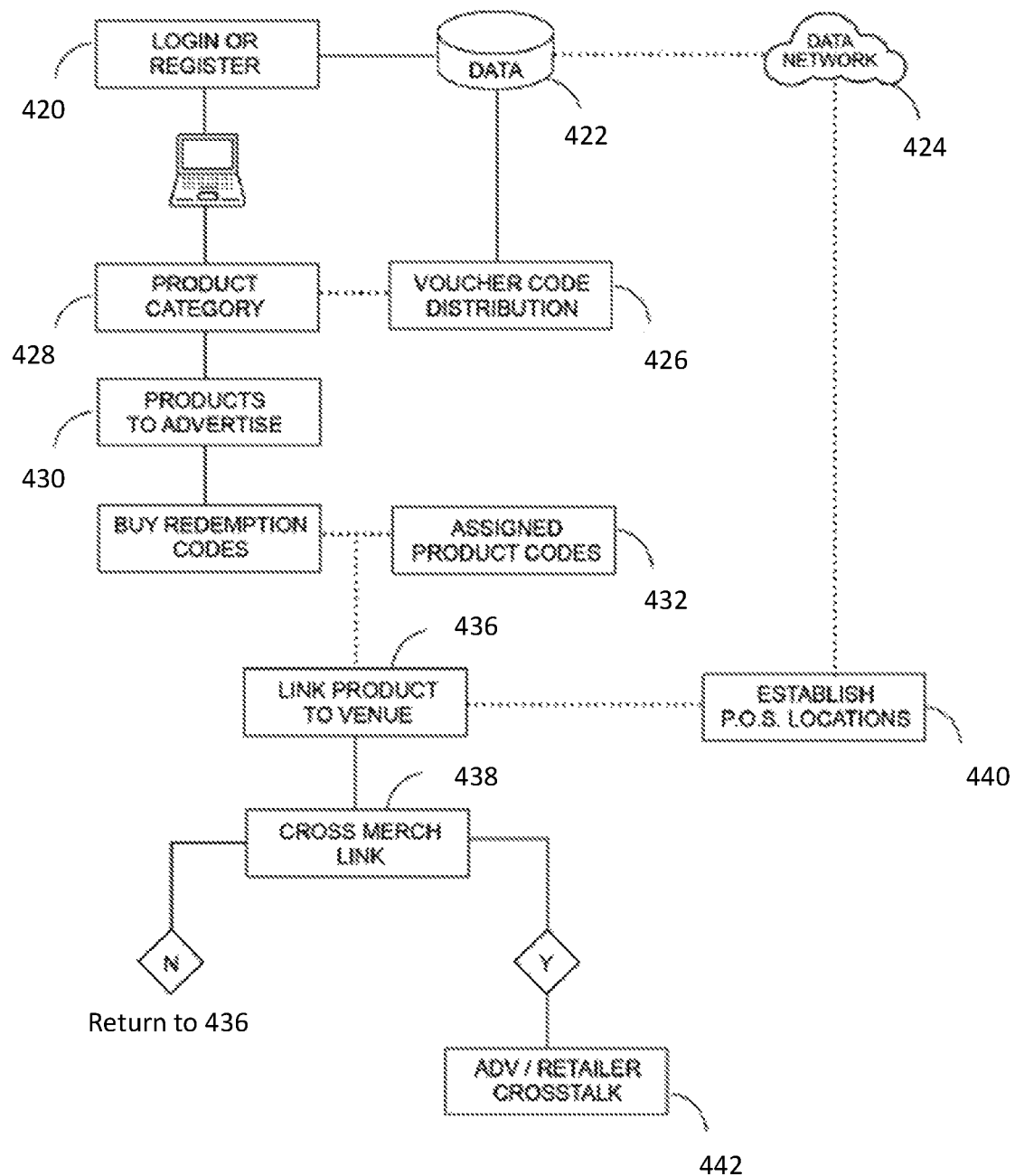
FIG. 21 depicts a flow chart of operations of one aspect of one embodiment of the invention.

FIG. 21 depicts a flow chart showing managerial functions within the system. The system involves a retailer or advertiser logging in 420. Once the login information is verified, access to the data store 422 is granted. The data store and the system are in communication with point of sale locations 440 using a data network 424. The system communicates with the data store 422 to ensure that voucher codes 426 are distributed. The advertiser or retailer logged into the system can manage product categories 428 and which products to advertise 430 using the promotions. The products are assigned product codes 432. The redemption codes and the product codes are linked to product venues 436 and point of sale locations 440. Finally, the advertiser or retailer can add cross merchandising links 438 and also include advanced retailer crosstalk 442.

System Schematic

Figure 22:
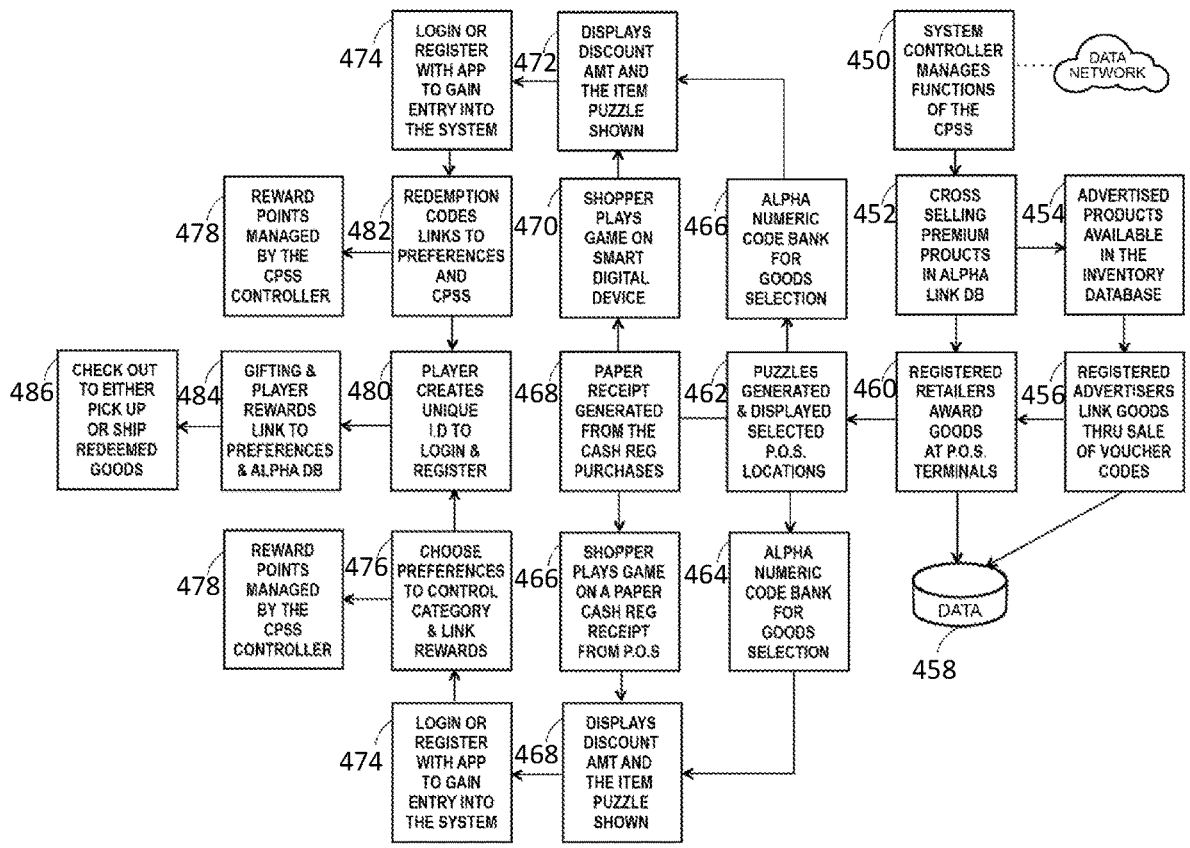
FIG. 22 depicts a flow chart of operations of one aspect of one embodiment of the invention.

The interactions between the system components and the various functions of one embodiment of the system are shown in schematic format in FIG. 22. As shown in FIG. 22, the system controller 450 manages the functions of the CPSS and other functions.

The first function of the controller 450 is the cross selling premium products in alphabet links database, using the cross merchandising within the gameplay board 452.

In one embodiment, the system verifies the inventory database 454 before making such cross-merchandising available. The cross merchandising products are advertised by registered advertisers by use of cross linked voucher codes 456. The voucher codes and other data is stored in a data store 458, in one embodiment. The registered advertisers also specify which products in the inventory 454 are to be award goods at the point of sale terminals 460.

Once the settings are finalized 460, the puzzle boards are generated and added to receipts or otherwise displayed at point of sale locations 462. Two alpha numeric code banks are created at point of sale locations 464, 466. At the point of sale a receipt is generated 468. For the first code bank 464, the display of a discount amount and the item is set 468. The player will solve the puzzle on a paper cash register receipt from the point of sale 466. The end user may also bypass the paper receipt and play the game on a smart device 470. The second data store 466 will display the amount and item puzzle 472. Regardless of how the player reaches the app, the player will need to login or register with the app to gain entry into the system 474. The player can choose preferences to control category and link rewards 476 once they are logged into the system. The reward points are managed by the CPSS controller 478. The player will also set up a unique identifier and login to register to play the game 480. The player may also redeem codes and link to preferences as well as the CPSS 482. The player may also send reward codes as gifts 484 and check out purchases that used a won discount or other redemption code 486.

Sample Consumer Interaction

Figure 23:
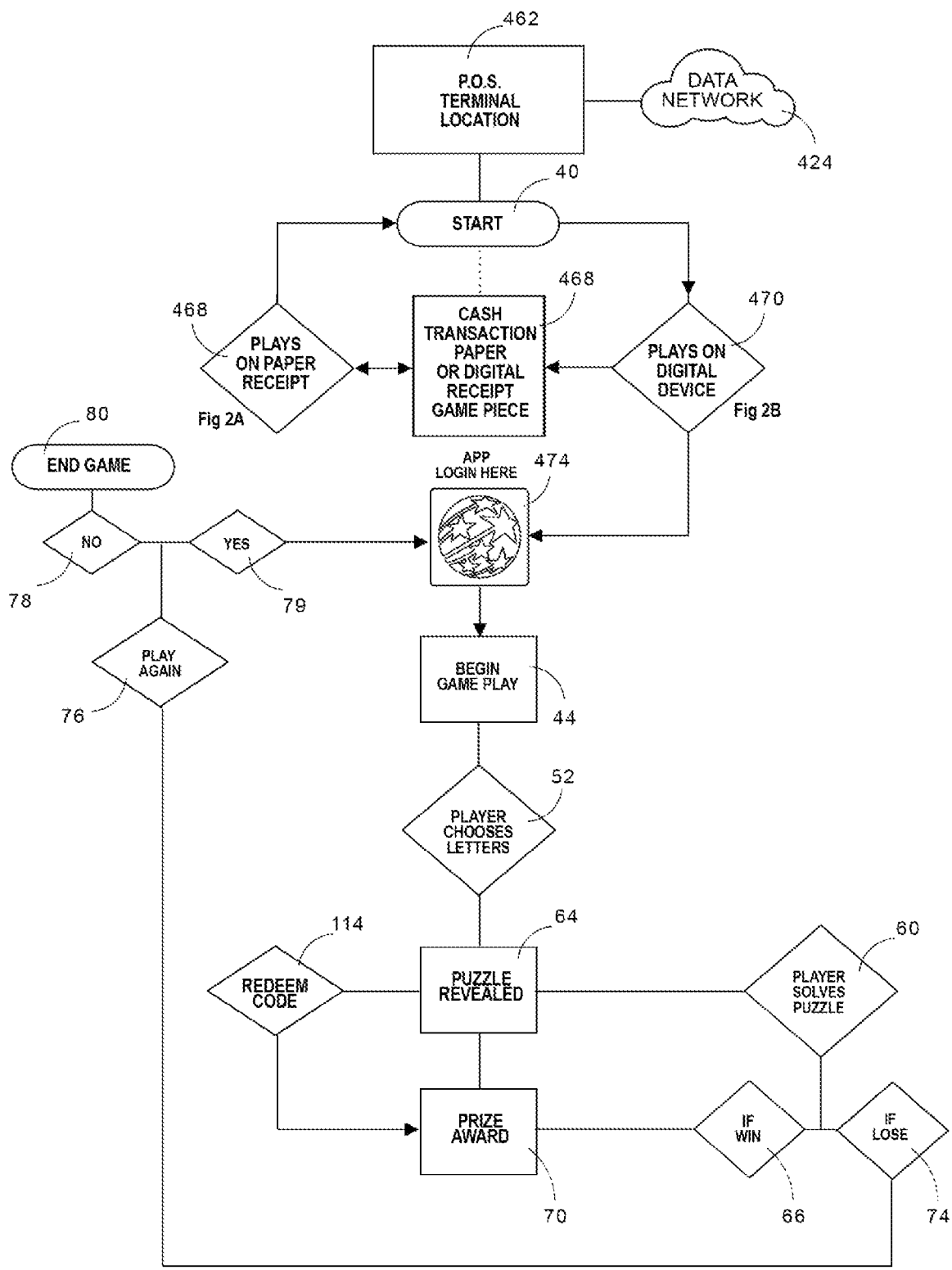
FIG. 23 depicts a flow chart of operations of one aspect of one embodiment of the invention.

FIG. 23 depicts a sample consumer interaction with the system. In the depicted embodiment, the point of sale terminal location 462 is in communication with a data network 424. The data network 424 provides a connection to a system that comprises an implementation of the system as described above. The customer interaction starts at beginning state 40. The consumer completes a point of sale transaction, receiving a paper or digital receipt game piece 468. The consumer then plays the game on a paper receipt 468 as shown in FIG. 2A or on a digital device 470 as shown in FIG. 2B.

Regardless of how the game starts, the consumer will log in to the application 474 and begin game play 44. The player will choose letters 52 and eventually the puzzle will be revealed 64. The player will solve the puzzle 60. The player may redeem a code 114, in one embodiment of the system. The prize is awarded 70 when the puzzle is revealed if the player meets the winning conditions 66. If the player loses 74, the player has the option to play again 76 which can be confirmed at state 79 or discontinue playing 78, in which case the game ends 80.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

The present methods can involve any or all of the steps or conditions discussed above in various combinations, as desired. Accordingly, it will be readily apparent to the skilled artisan that in some of the disclosed methods certain steps can be deleted or additional steps performed without affecting the viability of the methods.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A method for promoting sales and increasing brand recognition comprising:
   selecting by a promotion administrator product categories at a website administration portal hosted on an administration server;
   updating by the administration server a retailer database and a product database;
   selecting by the promotion administrator which brand will participate in a promotion at a retailer location and the rewards associated with each promotion;
   assigning by the administration server random alphanumeric codes to be used to point of sale terminals along with puzzles; and
   transmitting by the administration server to a retailer database promotion information including a set of codes and brand name puzzles to be printed on receipts;
   selecting by a point of sale terminal a brand name and alphanumeric code from the retailer database based on customer purchases;
   printing by the point of sale terminal a paper receipt which includes a list of purchases and a game piece wherein the game piece comprises the alphanumeric code and the selected puzzle;
   downloading a game application on a customer's device, wherein the game application is in communication with the administration server and retailer database;
   accepting by the game application the printed alphanumeric code from the customer's receipt;
   displaying on the customer's device the associated puzzle retrieved from the retailer database;
   entering by the customer letters into the customer's device thereby completing the selected puzzle during a required time period;
   determining by the game application whether the customer completed the puzzle within the required time period by the game application comparing the customer's entry with a solution to the puzzle;
   verifying by the application that the customer solved the puzzle;
   when it is determined that the customer solved the puzzle, retrieving by the application from the administration server a prize depending on the entries in the retailer database, the prizes selected by the prize administrator, and
   presenting by the application the prize to the customer.

2. The method as recited in claim 1 wherein the displaying step further comprises the selecting by the game application one or more random letters to display thereby guiding the customer in solving the puzzle.

3. The method as recited in claim 1 wherein the prize retrieved from the administration server comprises a cross-merchandising offer based on current inventory levels as determined by the administration server after referring to the retailer database.

4. The method as recited in claim 1 wherein the website administration portal comprises a dashboard wherein the promotion administrator selects the number of products and a brand alphabet.

* * * * *